United States Patent
Chen et al.

(10) Patent No.: US 12,411,293 B2
(45) Date of Patent: Sep. 9, 2025

(54) OPTICAL MODULE HAVING CONDUCTIVE FIBER SHEET

(71) Applicant: Hisense Broadband Multimedia Technologies Co., Ltd., Shandong (CN)

(72) Inventors: Jinlei Chen, Shandong (CN); Yantao Zhu, Shandong (CN); Hongchao Pan, Shandong (CN); Baofeng Si, Shandong (CN); Wei Cui, Shandong (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 386 days.

(21) Appl. No.: 17/897,589

(22) Filed: Aug. 29, 2022

(65) Prior Publication Data
US 2022/0413238 A1 Dec. 29, 2022

Related U.S. Application Data

(63) Continuation of application No. PCT/CN2021/100971, filed on Jun. 18, 2021.

(30) Foreign Application Priority Data

Aug. 13, 2020 (CN) .......................... 202010811010.9
Sep. 8, 2020 (CN) .......................... 202021942876.5

(51) Int. Cl.
*G02B 6/42* (2006.01)
*H01R 13/6581* (2011.01)
(Continued)

(52) U.S. Cl.
CPC ....... *G02B 6/4277* (2013.01); *H01R 13/6581* (2013.01); *H01R 13/6582* (2013.01); *H01R 13/6598* (2013.01)

(58) Field of Classification Search
CPC ............ H01R 13/6598; H01R 13/6599; H01R 13/6581; H01R 13/6582; H01R 13/6583;
(Continued)

(56) References Cited

U.S. PATENT DOCUMENTS

| 6,018,461 A | 1/2000 | Biermann et al. |
| 6,066,001 A * | 5/2000 | Liptak ................. H01R 13/6582 439/607.17 |

(Continued)

FOREIGN PATENT DOCUMENTS

| CN | 1893779 A | 1/2007 | |
| CN | 101026414 A * | 8/2007 | ......... H01R 13/6582 |

(Continued)

OTHER PUBLICATIONS

International Search Report (PCT/ISA/210) and Written Opinion (PCT/ISA/237) issued in PCT Application No. PCT/CN2021/100971 dated Sep. 1, 2021 with English Translation.
(Continued)

*Primary Examiner* — Marcus E Harcum
(74) *Attorney, Agent, or Firm* — Morgan, Lewis & Bockius LLP

(57) ABSTRACT

An optical module includes a shell, an elastic sleeve and a conductive fiber sheet. The shell has a groove disposed on an outer wall thereof. The elastic sleeve includes a metal frame and a plurality of metal elastic pieces. The metal frame is sleeved in the groove, and the metal frame is fixedly connected to the shell. The plurality of metal elastic pieces are disposed on an edge of the metal frame and extend to an outside of the metal frame. The conductive fiber sheet is disposed between the shell and the elastic sleeve for connecting the shell and the elastic sleeve.

16 Claims, 11 Drawing Sheets

(51) Int. Cl.
*H01R 13/6582* (2011.01)
*H01R 13/6598* (2011.01)

(58) Field of Classification Search
CPC . H01R 13/6584; G02B 6/4277; G02B 6/4246
USPC ............... 439/607.17, 607.19, 607.2, 95, 96
See application file for complete search history.

(56) References Cited

U.S. PATENT DOCUMENTS

| | | | | |
|---|---|---|---|---|
| 6,095,862 | A * | 8/2000 | Doye | H01R 13/6584 439/138 |
| 6,132,253 | A * | 10/2000 | Wu | H01R 13/6594 439/607.19 |
| 7,150,653 | B1 * | 12/2006 | Mason | H01R 13/6582 439/607.18 |
| 7,597,590 | B2 * | 10/2009 | McColloch | G02B 6/4201 29/874 |
| 7,857,662 | B2 * | 12/2010 | Gillespie | H01R 13/658 439/607.2 |
| 7,928,324 | B2 * | 4/2011 | Moore | H05K 9/0058 174/382 |
| 8,342,881 | B2 * | 1/2013 | Lang | H01R 24/00 439/607.01 |
| 8,439,706 | B2 * | 5/2013 | Sytsma | H01R 13/6582 439/607.19 |
| 8,622,770 | B2 * | 1/2014 | Teo | G02B 6/4277 439/607.2 |
| 9,188,752 | B2 * | 11/2015 | Nong Chou | G02B 6/4266 |
| 10,317,633 | B2 * | 6/2019 | Yu | H05K 7/1427 |
| 10,555,444 | B2 * | 2/2020 | Wang | H04B 10/40 |
| 10,588,243 | B2 * | 3/2020 | Little | H01R 13/502 |
| 11,710,932 | B2 * | 7/2023 | Listing | H01R 13/6582 439/607.19 |
| 2004/0027818 | A1 * | 2/2004 | Rathnam | H01R 13/6582 361/816 |
| 2004/0196642 | A1 | 10/2004 | Aronson et al. | |
| 2005/0117913 | A1 * | 6/2005 | Hung | G02B 6/4214 398/139 |
| 2007/0020971 | A1 | 1/2007 | Everett et al. | |
| 2007/0117458 | A1 * | 5/2007 | Winker | G02B 6/4201 439/607.01 |
| 2007/0212942 | A1 * | 9/2007 | Long | G02B 6/4256 439/607.17 |
| 2007/0237489 | A1 * | 10/2007 | Sasser | G02B 6/4284 385/147 |
| 2008/0205895 | A1 * | 8/2008 | Moore | G02B 6/4256 398/135 |
| 2009/0067849 | A1 | 3/2009 | Oki et al. | |
| 2009/0129725 | A1 * | 5/2009 | Durrant | G02B 6/4201 385/14 |
| 2009/0196008 | A1 * | 8/2009 | McColloch | H05K 9/0058 29/882 |
| 2011/0300735 | A1 * | 12/2011 | Wu | H01R 13/6275 439/345 |
| 2012/0148201 | A1 * | 6/2012 | Kondou | G02B 6/428 385/92 |
| 2012/0214345 | A1 * | 8/2012 | Wu | H01R 13/6583 439/607.19 |
| 2014/0273547 | A1 * | 9/2014 | Green | H01R 13/6485 439/55 |
| 2015/0093936 | A1 * | 4/2015 | Little | H01R 24/64 439/607.19 |
| 2017/0160500 | A1 * | 6/2017 | Zhao | G02B 6/4292 |
| 2017/0160502 | A1 | 6/2017 | Zhao et al. | |
| 2017/0168249 | A1 | 6/2017 | Maeda et al. | |
| 2019/0098804 | A1 | 3/2019 | Wang et al. | |

FOREIGN PATENT DOCUMENTS

| | | | | | |
|---|---|---|---|---|---|
| CN | 202979572 | U | | 6/2013 | |
| CN | 203691413 | U | | 7/2014 | |
| CN | 203691414 | U | | 7/2014 | |
| CN | 203691856 | U | | 7/2014 | |
| CN | 203708259 | U | | 7/2014 | |
| CN | 105403964 | A | | 3/2016 | |
| CN | 205157852 | U | | 4/2016 | |
| CN | 205157853 | U | | 4/2016 | |
| CN | 106772833 | A | * | 5/2017 | |
| CN | 106873091 | A | | 6/2017 | |
| CN | 107438784 | A | | 12/2017 | |
| CN | 206804930 | U | | 12/2017 | |
| CN | 206923238 | U | | 1/2018 | |
| CN | 108037568 | A | | 5/2018 | |
| CN | 108983373 | A | * | 12/2018 | ............ G02B 6/4277 |
| CN | 209281013 | U | | 8/2019 | |
| CN | 210690883 | U | | 6/2020 | |
| CN | 210835357 | U | | 6/2020 | |
| CN | 210984969 | U | | 7/2020 | |
| CN | 212647089 | U | | 3/2021 | |
| CN | 213091953 | U | | 4/2021 | |
| CN | 213122372 | U | | 5/2021 | |

OTHER PUBLICATIONS

International Search Report (PCT/ISA/210) and Written Opinion (PCT/ISA/237) issued in PCT Application No. PCT/CN2021/100973 dated Sep. 15, 2021 with English Translation.

International Search Report (PCT/ISA/210) and Written Opinion (PCT/ISA/237) issued in PCT Application No. PCT/CN2021/116995 dated Nov. 2, 2021 with English Translation.

Office Action issued in corresponding Chinese Patent Application No. 202010811010.9 dated Jun. 2, 2022 with English Translation.

* cited by examiner

US 12,411,293 B2

OPTICAL MODULE HAVING CONDUCTIVE FIBER SHEET

CROSS-REFERENCE TO RELATED APPLICATIONS

This application is a Continuation Application of PCT/CN2021/100971 filed on Jun. 18, 2021, which claims priority to Chinese Patent Application No. 202010811010.9 filed on Aug. 13, 2020, and Chinese Patent Application No. 202021942876.5 filed on Sep. 8, 2020, which are incorporated herein by reference in their entirety.

TECHNICAL FIELD

The present disclosure relates to the field of optical communication technologies, and in particular, to an optical module.

BACKGROUND

Optical communication technologies are used in new services and application scenarios such as cloud computing, mobile internet, and video conferencing. In optical communication, an optical module is a tool for achieving interconversion between an optical signal and an electrical signal, and is one of key devices in an optical communication device. The optical module generally includes a light emitting device and a light receiving device. The light emitting device is configured to convert an electrical signal into an optical signal, and transmit the optical signal out through an optical fiber, and the light receiving device is configured to convert an optical signal transmitted from the optical fiber into an electrical signal.

SUMMARY

In an aspect, an optical module is provided. The optical module includes a shell, an elastic sleeve and a conductive fiber sheet. The shell has a groove disposed on an outer wall thereof. The elastic sleeve includes a metal frame and a plurality of metal elastic pieces. The metal frame is sleeved in the groove, and the metal frame is fixedly connected to the shell. The plurality of metal elastic pieces are disposed on an edge of the metal frame and extend to an outside of the metal frame. The conductive fiber sheet is disposed between the shell and the elastic sleeve for connecting the shell and the elastic sleeve.

In another aspect, an optical module is provided. The optical module includes a shell, an unlocking component and at least one conductive fiber sheet. The shell has at least one recessed area disposed on an outer wall thereof. The unlocking component is connected to the at least one recessed area. The at least one conductive fiber sheet is disposed in a corresponding recessed area and located between the unlocking component and the shell, and the at least one conductive fiber sheet is connected to the shell and the unlocking component.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
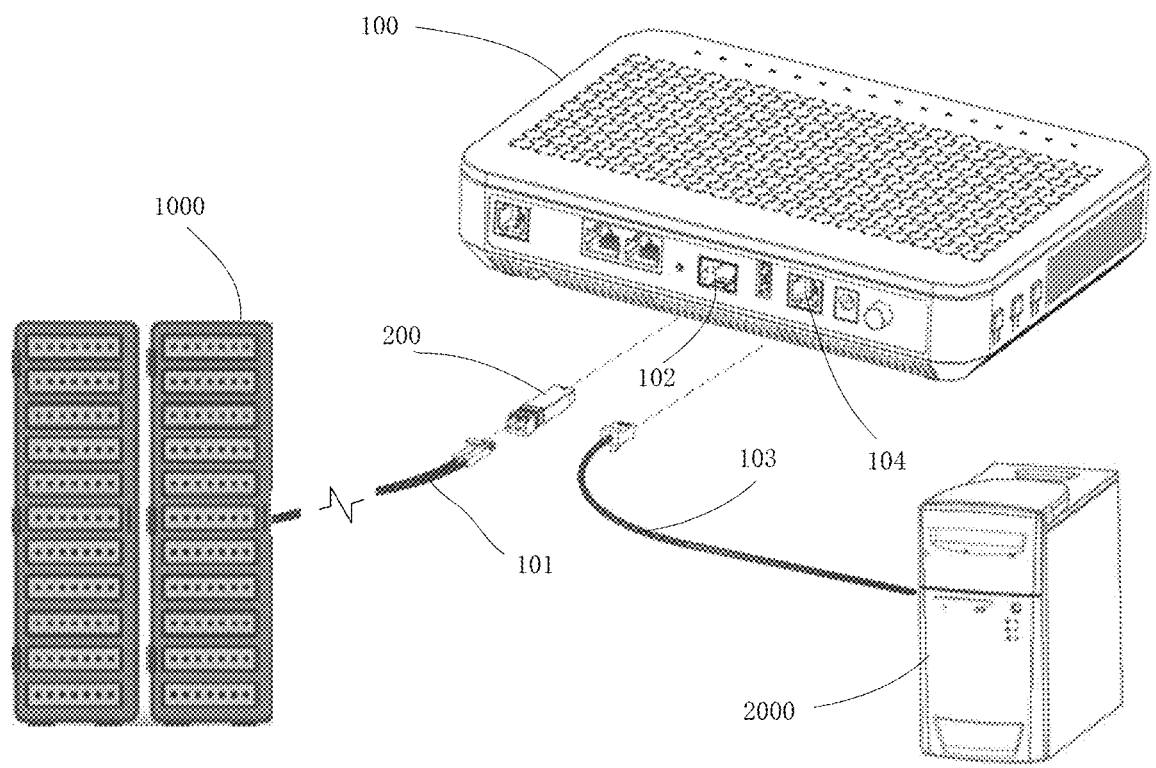
FIG. 1 is a diagram showing a connection relationship of an optical communication system, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to". In the description, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first" and "second" are only used for descriptive purposes, and cannot be construed as indicating or implying the relative importance or implicitly indicating the number of indicated technical features. Thus, features defined with "first" and "second" may explicitly or implicitly include one or more of the features. In the description of the embodiments of the present disclosure, the term "a plurality of" means two or more unless otherwise specified.

In the description of some embodiments, the terms "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

The term such as "about", "substantially" or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

In an optical communication system, an optical signal is used to carry information to be transmitted, and the optical signal carrying the information is transmitted to an information processing device such as a computer through an information transmission device such as an optical fiber or an optical waveguide, so as to achieve transmission of the information. Since light has a characteristic of passive transmission when being transmitted through the optical fiber or the optical waveguide, low-cost and low-loss information transmission may be achieved. In addition, since a signal transmitted by the information transmission device such as the optical fiber or the optical waveguide is an optical signal, and a signal that can be recognized and processed by the information processing device such as a computer is an electrical signal, in order to establish information connection between the information transmission device such as the optical fiber or the optical waveguide and the information processing device such as the computer, there is a need to achieve interconversion between the electrical signal and the optical signal.

In the field of optical communication technology, an optical module may be used to achieve the interconversion between the optical signal and the electrical signal. The optical module includes an optical port and an electrical port. The optical module achieves optical communication with the information transmission device such as the optical fiber or the optical waveguide through the optical port, and achieves electrical connection with an optical network terminal (e.g., an optical modem) through the electrical port. The electrical connection is mainly used to achieve power supply, transmission of an I2C signal, transmission of data information and grounding. The optical network terminal transmits the electrical signal to the information processing device such as the computer through a network cable or wireless fidelity (Wi-Fi).

FIG. 1 is a diagram showing a connection relationship of an optical communication system. As shown in FIG. 1, the optical communication system includes a remote server 1000, a local information processing device 2000, an optical network terminal 100, an optical module 200, an optical fiber 101 and a network cable 103.

One end of the optical fiber 101 is connected to the remote server 1000, and the other end of the optical fiber 101 is connected to the optical network terminal 100 through the optical module 200. The optical fiber itself may support long-distance signal transmission, such as several-kilometer (six-kilometer to eight-kilometer) signal transmission. On this basis, infinite-distance transmission may be realized theoretically if a repeater is used. Therefore, in a typical optical communication system, a distance between the remote server 1000 and the optical network terminal 100 may typically reach several kilometers, tens of kilometers, or hundreds of kilometers.

One end of the network cable 103 is connected to the local information processing device 2000, and the other end of the network cable 103 is connected to the optical network terminal 100. The local information processing device 2000 may be any one or more of the following devices: a router, a switch, a computer, a mobile phone, a tablet computer, a television, etc.

A physical distance between the remote server 1000 and the optical network terminal 100 is greater than a physical distance between the local information processing device 2000 and the optical network terminal 100. Connection between the local information processing device 2000 and the remote server 1000 is implemented by the optical fiber 101 and the network cable 103, and connection between the optical fiber 101 and the network cable 103 is implemented by the optical module 200 and the optical network terminal 100.

The optical module 200 includes an optical port and an electrical port. The optical port is configured to be connected to the optical fiber 101, so that bidirectional optical signal connection is established between the optical module 200 and the optical fiber 101. The electrical port is configured to be connected to the optical network terminal 100, so that bidirectional electrical signal connection is established between the optical module 200 and the optical network terminal 100. The optical module 200 achieves the inter-conversion between the optical signal and the electrical signal, so that information connection between the optical fiber 101 and the optical network terminal 100 is established. For example, an optical signal from the optical fiber 101 is converted into an electrical signal by the optical module 200, and then the electrical signal is input into the optical network terminal 100; an electrical signal from the optical network terminal 100 is converted into an optical signal by the optical module 200, and then the optical signal is input into the optical fiber 101. Since the optical module 200 is a tool for achieving the interconversion between the optical signal and the electrical signal, and does not have a function of processing data, the information does not change in the above photoelectric conversion process.

The optical network terminal 100 includes a substantially cuboid housing, and an optical module interface 102 and a network cable interface 104 that are disposed on the housing. The optical module interface 102 is configured to be connected to the optical module 200, so that the bidirectional electrical signal connection between the optical network terminal 100 and the optical module 200 is established. The network cable interface 104 is configured to be connected to the network cable 103, so that bidirectional electrical signal connection between the optical network terminal 100 and the network cable 103 is established. Connection between the optical module 200 and the network cable 103 is established through the optical network terminal 100. For example, the optical network terminal transmits an electrical signal from the optical module 200 to the network cable, and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

The remote server 1000 establishes a bidirectional signal transmission channel with the local information processing device 2000 through the optical fiber 101, the optical module 200, the optical network terminal 100 and the network cable 103.

Figure 2:
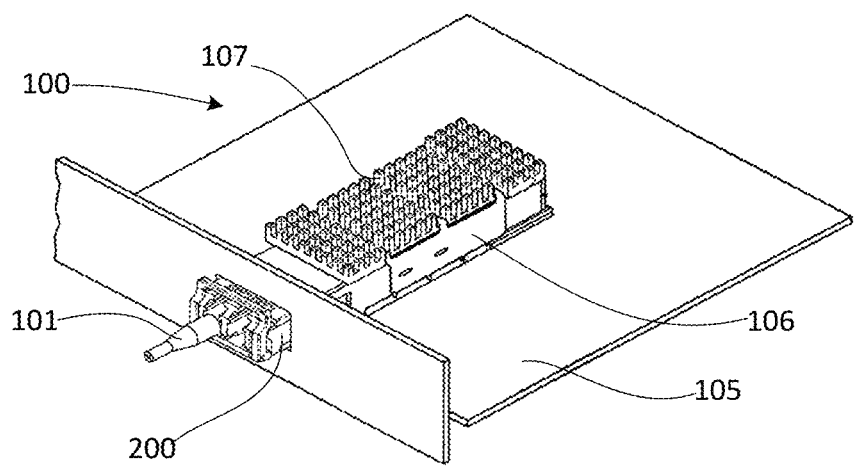
FIG. 2 is a structural diagram of an optical network terminal, in accordance with some embodiments.

FIG. 2 is a structural diagram of an optical network terminal. In order to clearly show a connection relationship between the optical module 200 and the optical network terminal 100, FIG. 2 only shows a structure of the optical network terminal 100 related to the optical module 200. As shown in FIG. 2, the optical network terminal 100 further includes a circuit board 105 disposed in the housing, a cage 106 disposed on a surface of the circuit board 105, an electrical connector disposed inside the cage 106, and a heat sink 107 disposed on the cage 106. The electrical connector is configured to be connected to the electrical port of the optical module 200. The heat sink 107 has protruding portions such as fins for increasing a heat dissipation area.

The optical module 200 is inserted into the cage 106 of the optical network terminal 100, the optical module 200 is fixed by the cage 106, and heat generated by the optical module 200 is conducted to the cage 106 and is diffused through the heat sink 107. After the optical module 200 is inserted into the cage 106, the electrical port of the optical module 200 is connected to the electrical connector inside the cage 106, so that the bidirectional electrical signal connection between the optical module 200 and the optical network terminal 100 is established. In addition, the optical port of the optical module 200 is connected to the optical fiber 101, so that the bidirectional optical signal connection between the optical module 200 and the optical fiber 101 is established.

Figure 3:
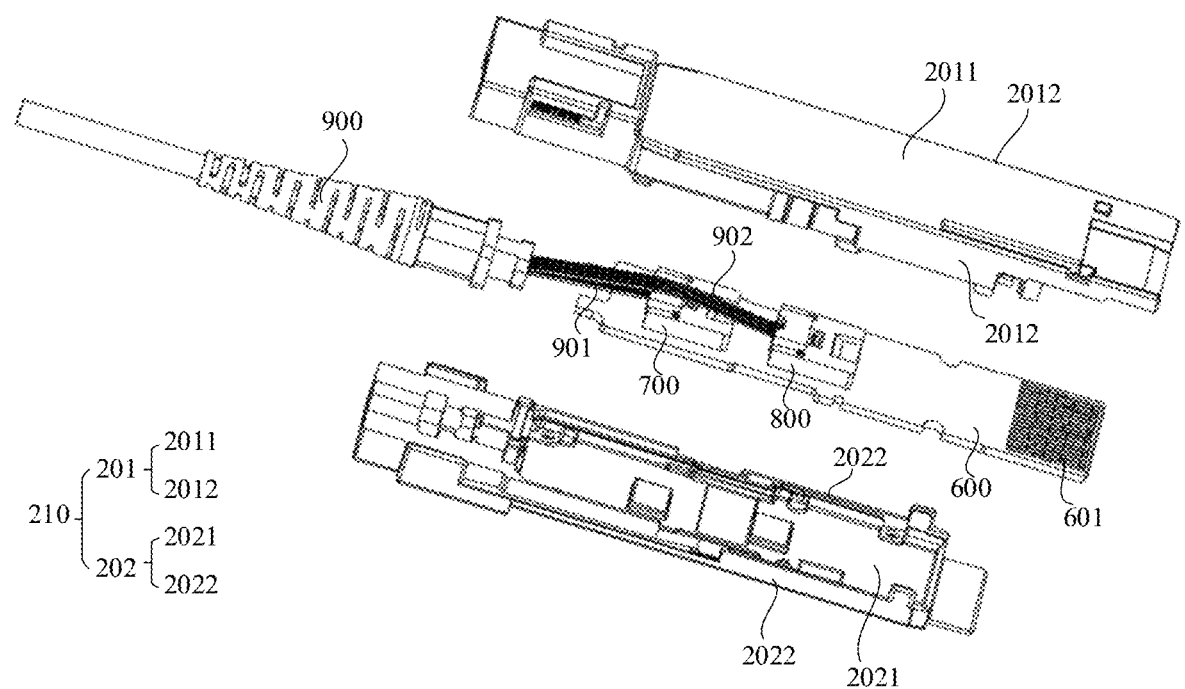
FIG. 3 is an exploded structural diagram of an optical module, in accordance with some embodiments.

FIG. 3 is an exploded structural diagram of an optical module according to some embodiments. As shown in FIG. 3, the optical module 200 includes a shell 210, a circuit board 600, a light emitting device 700 and a light receiving device 800 that are disposed in the shell 210.

The shell 210 includes an upper shell 201 and a lower shell 202. The upper shell 201 covers the lower shell 202 to form the shell 210 with two openings, and an outer contour of the shell 210 is generally in a cuboid shape.

In some embodiments, the lower shell 202 includes a bottom plate 2021 and two lower side plates 2022 located on two sides of the bottom plate 2021 and disposed perpendicular to the bottom plate 2021. The upper shell 201 includes a cover plate 2011, and the cover plate 2011 covers the two lower side plates 2022 of the lower shell 202 to form the shell 210.

In some embodiments, as shown in FIG. 3, the lower shell 202 includes the bottom plate 2021 and the two lower side plates 2022 located on the two sides of the bottom plate 2021 and disposed perpendicular to the bottom plate 2021. The upper shell 201 includes the cover plate 2011 and two upper side plates 2012 located on two sides of the cover plate 2011 and disposed perpendicular to the cover plate 2011. The two upper side plates 2012 are combined with the two lower side plates 2022, so that the upper shell 201 covers the lower shell 202.

A direction in which a connecting line between the two openings 204 and 205 is located may be the same as a longitudinal direction of the optical module 200, or may not be the same as the longitudinal direction of the optical module 200. For example, the opening 204 is located at an end (a right end in FIG. 4) of the optical module 200, and the opening 205 is also located at an end (a left end in FIG. 4) of the optical module 200. Alternatively, the opening 204 is located at an end of the optical module 200, and the opening 205 is located at a side of the optical module 200. The opening 204 is the electrical port. A connecting finger 601 of the circuit board 600 extends from the electrical port 204, and is inserted into the master monitor (e.g., the optical network terminal 100). The opening 205 is the optical port, and is configured to be connected to an external optical fiber 101, so that the external optical fiber 101 is connected to the light emitting device 700 and the light receiving device 800 inside the optical module 200.

By using an assembly manner of combining the upper shell 201 and the lower shell 202, it is convenient to install devices such as the circuit board 600, the light emitting device 700 and the light receiving device 800 into the shell 210, and the upper shell 201 and the lower shell 202 may form encapsulation protection for these devices. In addition, when the devices such as the circuit board 600, the light emitting device 700 and the light receiving device 800 are assembled, it is convenient to arrange positioning components, heat dissipation components and electromagnetic shielding components of these devices, which is conducive to implementation of automated production.

In some embodiments, the upper shell 201 and the lower shell 202 are generally made of a metal material, which facilitates electromagnetic shielding and heat dissipation.

The circuit board 600 includes a circuit wire, electronic elements and chips. Through the circuit wire, the electronic elements and the chips are connected together according to a circuit design, so as to implement functions such as power supply, transmission of electrical signals and grounding. The electronic elements include, for example, a capacitor, a resistor, a triode, and a metal-oxide-semiconductor field-effect transistor (MOSFET). The chips include, for example, a microcontroller unit (MCU), a laser driver chip, a limiting amplifier, a clock and data recovery (CDR) chip, a power management chip and a digital signal processing (DSP) chip.

The circuit board 600 further includes the connecting finger 601 formed on an end surface thereof, and the connecting finger 601 is composed of a plurality of independent pins. The circuit board 600 is inserted into the cage 106, and is conductively connected to the electrical connector in the cage 106 through the connecting finger 601. The connecting finger 601 may be disposed on only a surface (e.g., an upper surface shown in FIG. 3) of the circuit board 600, or may be disposed on both upper and lower surfaces of the circuit board 600 to adapt to an occasion with a demand for a large number of pins. The connecting finger 601 is configured to establish electrical connection with the master monitor to achieve power supply, grounding, transmission of an I2C signal, transmission of a data signal, etc.

The circuit board 600 is generally a rigid circuit board, and the rigid circuit board may also implement a load-bearing function due to its relatively hard material. For example, the rigid circuit board may stably bear the electronic elements and the chips. When the light emitting device 700 and the light receiving device 800 are located on the circuit board 600, the rigid circuit board may further provide a stable bearing. The rigid circuit board may further be inserted into the electrical connector in the cage of the master monitor.

Of course, flexible circuit boards are also used in some optical modules. A flexible circuit board is generally used in conjunction with the rigid circuit board as a supplement to the rigid circuit board. For example, the rigid circuit board is connected to the light emitting device 700 and the light receiving device 800 by means of the flexible circuit board.

The light emitting device 700 is configured to convert an electrical signal into an optical signal, and the light receiving device 800 is configured to convert an optical signal into an electrical signal. The light emitting device 700 and the light receiving device 800 may adopt a transistor outline (TO) package (i.e., coaxial package) or a chip on board (COB) package. The light emitting device 700 and the light receiving device 800 in FIG. 3 adopt the COB package.

In some embodiments, as shown in FIG. 3, the optical module 200 further includes a first optical fiber ribbon 901, a second optical fiber ribbon 902 and an optical fiber adapter 900. One end of the first optical fiber ribbon 901 is connected to the light emitting device 700, and the other end thereof is connected to the optical fiber adapter 900. One end of the second optical fiber ribbon 902 is connected to the light receiving device 800, and the other end thereof is connected to the optical fiber adapter 900. The optical fiber adapter 900 is configured to be connected to the external optical fiber 101. The light emitting device 700 is optically connected to the external optical fiber 101 through the first optical fiber ribbon 901, and the light receiving device 800 is optically connected to the external optical fiber 101 through the second optical fiber ribbon 902. An optical signal emitted by the light emitting device 700 is transmitted to the external optical fiber 101 through the first optical fiber ribbon 901, and an optical signal from the external optical fiber 101 is transmitted to the light receiving device 800 through the second optical fiber ribbon 902.

Figure 4:
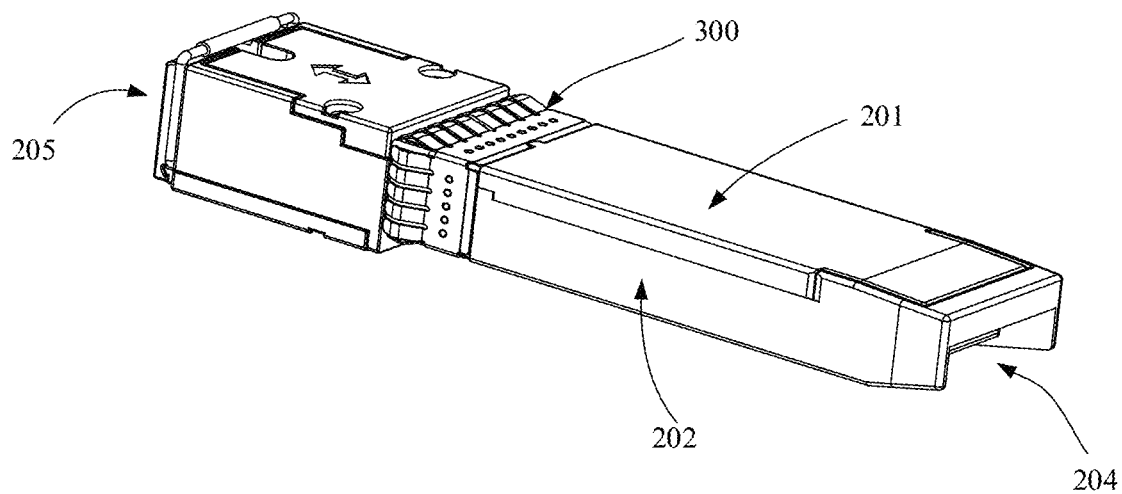
FIG. 4 is an assembly diagram of a shell and an elastic sleeve in an optical module, in accordance with some embodiments.
Figure 5:
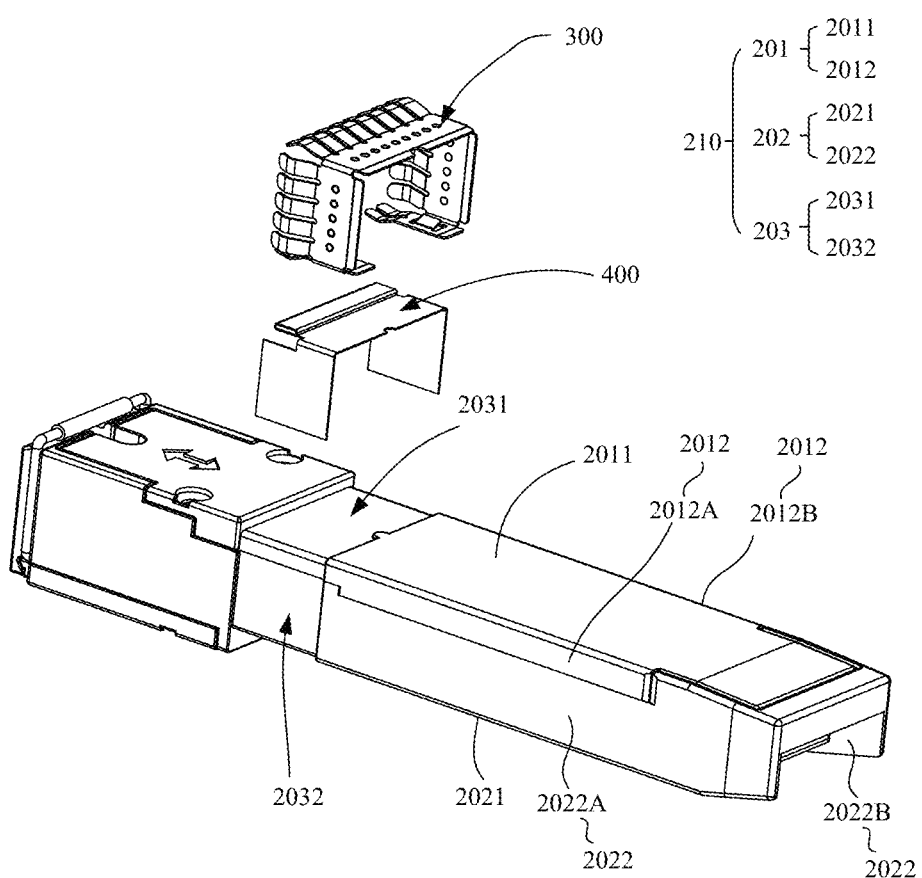
FIG. 5 is an exploded view of a shell, an elastic sleeve, and a conductive fiber sheet in an optical module, in accordance with some embodiments.

In order to prevent electromagnetic waves generated by the optical module from leaking from a gap between the shell of the optical module and the cage of the master monitor (e.g., the cage 106 of the optical network terminal 100), a conductive member is disposed between the shell of the optical module and the cage of the master monitor, so as to eliminate the gap between the shell of the optical module and the cage of the master monitor and achieve expected electromagnetic shielding effect. FIG. 4 is an assembly diagram of a shell and an elastic sleeve in an optical module according to some embodiments. FIG. 5 is an exploded view of a shell, an elastic sleeve, and a conductive fiber sheet in an optical module according to some embodiments. As shown in FIGS. 4 and 5, the optical module 200 further includes an elastic sleeve 300. The shell 210 has a groove 203, and the groove 203 is disposed on an outer wall of the shell 210 and surrounds the outer wall of the shell 210. The elastic sleeve 300 is sleeved in the groove 203 of the shell 210 and fixed with the bottom plate 2021 of the lower shell 202. The elastic sleeve 300 is configured to connect the shell 210 and the cage 106, so as to ensure sufficient contact between the shell 210 of the optical module 200 and the cage 106 of the optical network terminal 100, and block the gap between the shell 210 of the optical module 200 and the cage 106 of the optical network terminal 100.

In some embodiments, the groove 203 includes a first groove 2031 and a second groove 2032. The first groove 2031 is disposed on an outer wall of the upper shell 201. That is, the first groove 2031 is disposed on outer walls of the cover plate 2011 and the two upper side plates 2012. The second groove 2032 is disposed on an outer wall of the lower shell 202. That is, the second groove 2032 is disposed on outer walls of the bottom plate 2021 and the two lower side plates 2022.

When the optical module 200 is inserted into the cage 106, the elastic sleeve 300 is in contact with an inner surface of the cage 106, so as to block the gap between the shell 210 of the optical module 200 and the inner surface of the cage 106 of the optical network terminal 100. That is, a sealed cavity is formed between the shell 210 of the optical module 200 and the cage 106 of the optical network terminal 100 through the elastic sleeve 300, and electromagnetic waves generated by the optical module 200 are shielded in the sealed cavity, thereby preventing the electromagnetic waves from leaking to an outside of the cage 106 of the optical network terminal 100.

Figure 6:
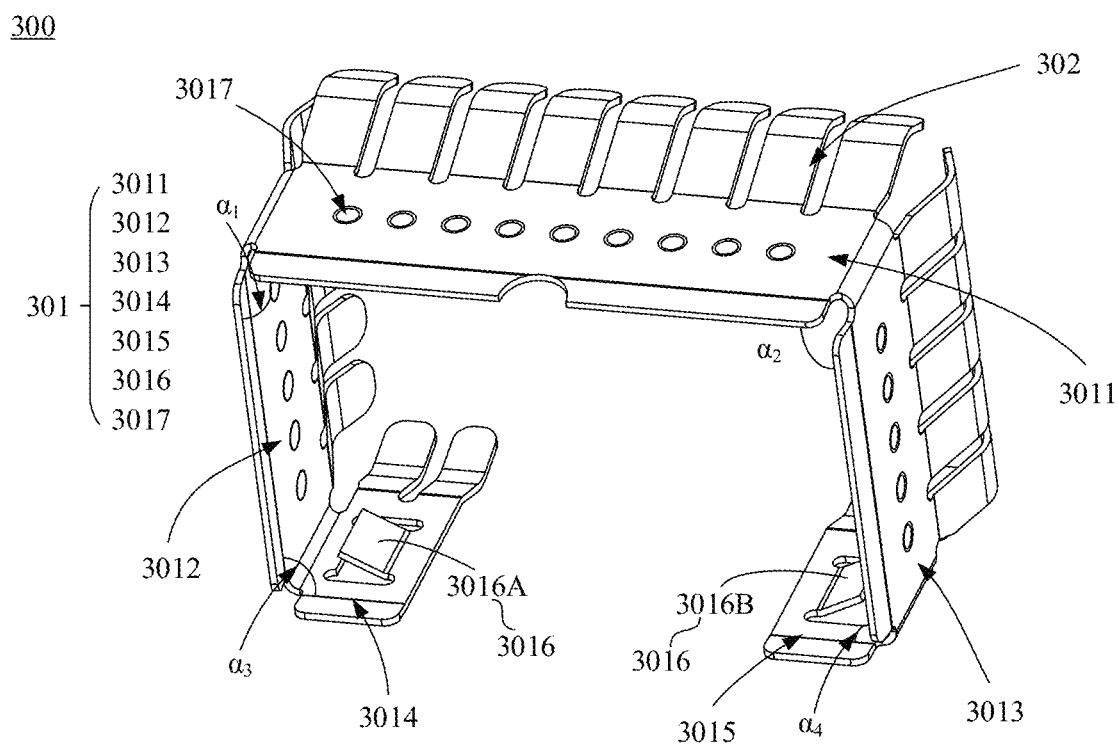
FIG. 6 is a structural diagram of an elastic sleeve in an optical module, in accordance with some embodiments.

FIG. 6 is a structural diagram of an elastic sleeve 300 in an optical module according to some embodiments. As shown in FIG. 6, the elastic sleeve 300 includes a metal frame 301 and a plurality of metal elastic pieces 302. The metal frame 301 is sleeved in the groove 203 of the shell 210 and is in sufficient contact with the shell 210. The plurality of metal elastic pieces 302 are uniformly disposed on an edge of the metal frame 301, and outer surfaces thereof are in contact with the inner surface of the cage 106. When the optical module 200 is inserted into the cage 106 of the optical network terminal 100, the plurality of metal elastic pieces 302 are squeezed by the inner surface of the cage 106 and thus elastically deformed, and the plurality of metal elastic pieces 302 are stuck at a socket of the cage 106, so as to block the gap between the shell 210 of the optical module 200 and the cage 106 of the optical network terminal 100.

The metal frame 301 includes a first side plate 3011, a second side plate 3012, a third side plate 3013, a fourth side plate 3014 and a fifth side plate 3015. One end of the first side plate 3011 is connected to the second side plate 3012, and the other end of the first side plate 3011 is connected to the third side plate 3013. An end of the second side plate 3012 away from the first side plate 3011 is connected to the fourth side plate 3014, and an end of the third side plate 3013 away from the first side plate 3011 is connected to the fifth side plate 3015. The second side plate 3012 and the third side plate 3013 are symmetrically arranged with respect to the first side plate 3011. That is, the second side plate 3012 and the third side plate 3013 are disposed on a same side of the first side plate 3011, and an included angle $\alpha_1$ between the second side plate 3012 and the first side plate 3011 is equal to an included angle $\alpha_2$ between the third side plate 3013 and the first side plate 3011. The fourth side plate 3014 and the fifth side plate 3015 are symmetrically arranged with respect to the first side plate 3011. That is, the fourth side plate 3014 and the fifth side plate 3015 both extend toward an inside of the elastic sleeve 300, and an included angle $\alpha_3$ between the fourth side plate 3014 and the second side plate 3012 is equal to an included angle $\alpha_4$ between the fifth side plate 3015 and the third side plate 3013. The fourth side plate 3014 and the fifth side plate 3015 are located in a same plane, and there is a gap between the fourth side plate 3014 and the fifth side plate 3015. That is to say, the first side plate 3011, the second side plate 3012, the third side plate 3013, the fourth side plate 3014 and the fifth side plate 3015 constitute a C-shaped metal member, and the metal frame 301 may be sleeved in the groove 203 through the gap between the fourth side plate 3014 and the fifth side plate 3015.

The two upper side plates 2012 are a first upper side plate 2012A and a second upper side plate 2012B, and the two lower side plates 2022 are a first lower side plate 2022A and a second lower side plate 2022B. When the metal frame 301 is sleeved in the groove 203, the first side plate 3011 is clamped into a groove on the cover plate 2011 of the upper shell 201, the second side plate 3012 is clamped into grooves on the first upper side plate 2012A of the upper shell 201 and the first lower side plate 2022A of the lower shell 202, and the third side plate 3013 is clamped into grooves on the second upper side plate 2012B of the upper shell 201 and the second lower side plate 2022B of the lower shell 202. The fourth side plate 3014 is clamped into a groove on the bottom plate 2021 of the lower shell 202, and the fifth side plate 3015 is clamped into the groove on the bottom plate 2021 of the lower shell 202.

Figure 7:
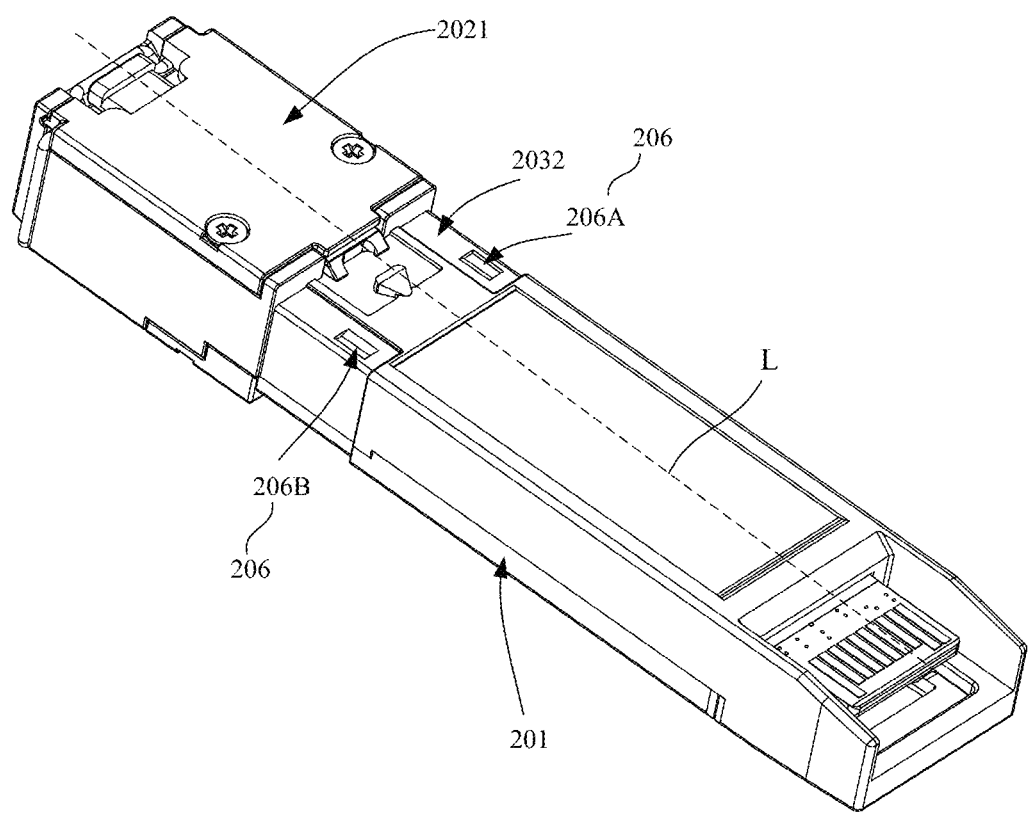
FIG. 7 is a diagram of a shell in an optical module from another perspective, in accordance with some embodiments.

FIG. 7 is a diagram of a shell in an optical module from another perspective according to some embodiments. As shown in FIG. 7, the shell 210 has two clamping grooves 206, which are a first clamping groove 206A and a second clamping groove 206B. The first clamping groove 206A and the second clamping groove 206B are both disposed on the bottom plate 2021 of the lower shell 202 and located in the second groove 2032. The first clamping groove 206A and the second clamping groove 206B are symmetrically arranged with respect to a symmetry axis L of the bottom plate 2021.

The metal frame 301 further includes two elastic fasteners 3016, which are a first elastic fastener 3016A and a second elastic fastener 3016B. The first elastic fastener 3016A is disposed on the fourth side plate 3014, the second elastic fastener 3016B is disposed on the fifth side plate 3015, and an elastic fastener 3016 is fixedly connected to a clamping groove 206. When the metal frame 301 is clamped into the groove 203 of the shell 210, the first elastic fastener 3016A on the fourth side plate 3014 and the second elastic fastener 3016B on the fifth side plate 3015 are respectively clamped into the first clamping groove 206A and the second clamping groove 206B on the bottom plate 2021 of the lower shell 202, so as to achieve fixing of the metal frame 301 and the bottom plate 2021 of the lower shell 202. As a result, the upper shell 201 and the lower shell 202 are wrapped in the metal frame 301.

In some embodiments, elastic fasteners 3016 on the fourth side plate 3014 and the fifth side plate 3015 of the metal frame 301 may be made by stamping process, so that an end of the first elastic fastener 3016A is connected to the fourth side plate 3014, and an end of the second elastic fastener 3016B is connected to the fifth side plate 3015. After the elastic fastener 3016 is clamped into the clamping groove 206 on the bottom plate 2021 of the lower shell 202, the elastic fastener 3016 may be pressed to be separated from the clamping groove 206, so that the elastic sleeve 300 is easily disassembled.

The plurality of metal elastic pieces 302 are uniformly disposed on edges of the first side plate 3011, the second side plate 3012, the third side plate 3013, the fourth side plate 3014 and the fifth side plate 3015 of the metal frame 301. The plurality of metal elastic pieces 302 extend to an outside of the elastic sleeve 300 along the edges of the first side plate 3011, the second side plate 3012, the third side plate 3013, the fourth side plate 3014 and the fifth side plate 3015, and are arranged in an umbrella shape.

It will be noted that the number of metal elastic pieces 302 disposed on the edges of the first side plate 3011, the second side plate 3012, the third side plate 3013, the fourth side plate 3014 and the fifth side plate 3015 is not limited. According to the actual situation, as many metal elastic pieces 302 as possible may be provided to increase a contact area between the elastic sleeve 300 and the cage 106.

After the elastic sleeve 300 is sleeved in the groove 203 of the shell 210, the metal frame 301 of the elastic sleeve 300 is in contact with the outer walls of the upper shell 201 and the lower shell 202, and the metal elastic pieces 302 of the elastic sleeve 300 are in contact with the inner surface of the cage 106, so that sealing between the shell 210 and the cage 106 is achieved. The elastic sleeve 300 is a metal member, and a sealed metal cavity is formed among the shell 210, the elastic sleeve 300 and the cage 106. In this way, electromagnetic waves between the cage 106 and the shell 210 are shielded to prevent the electromagnetic waves from leaking out of the cage 106.

In addition, since contact between the metal frame 301 of the elastic sleeve 300 and the shell 210 is surface contact, a gap is likely to exist between the metal frame 301 and the shell 210, which causes the electromagnetic waves to leak out from the gap between the metal frame 301 and the shell 210. Therefore, the optical module 200 further includes a conductive fiber sheet 400 disposed between the elastic sleeve 300 and the shell 210. The conductive fiber sheet 400 is configured to connect the shell 210 and the elastic sleeve 300, so that the elastic sleeve 300 is in sufficient contact with the shell 210 to block the gap between the metal frame 301 and the shell 210 of the optical module 200. As a result, sufficient contact between the shell 210 of the optical module 200 and the cage 106 of the optical network terminal 100 is further ensured.

The conductive fiber sheet 400 may have elasticity, and the conductive fiber sheet 400 may be deformed by a squeeze. In this way, when the metal frame 301 of the elastic sleeve 300 is clamped into the groove 203, the metal frame 301 will squeeze the conductive fiber sheet 400, so that the conductive fiber sheet 400 blocks the gap between the shell 210 of the optical module 200 and the metal frame 301. In addition, the conductive fiber sheet 400 has certain elasticity, so that the elastic sleeve 300 may be more easily clamped into the groove 203 of the shell 210 of the optical module 200.

Figure 8:
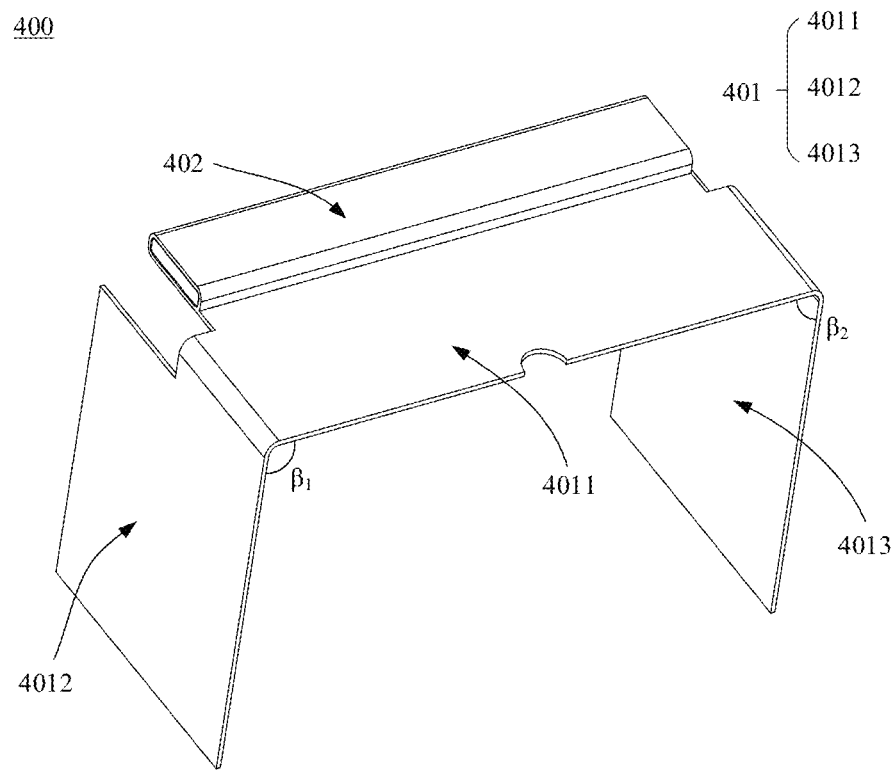
FIG. 8 is a structural diagram of a conductive fiber sheet in an optical module, in accordance with some embodiments.

FIG. 8 is a structural diagram of a conductive fiber sheet in an optical module according to some embodiments. As shown in FIG. 8, the conductive fiber sheet 400 includes a conductive frame 401 and a conductive elastic member 402. The conductive frame 401 includes a first conductive sheet 4011, a second conductive sheet 4012 and a third conductive sheet 4013. One end of the first conductive sheet 4011 is connected to the second conductive sheet 4012, and the other end thereof is connected to the third conductive sheet 4013. The second conductive sheet 4012 and the third conductive sheet 4013 are symmetrically arranged with respect to the first conductive sheet 4011. That is, the second conductive sheet 4012 and the third conductive sheet 4013 are arranged on a same side of the first conductive sheet 4011, and an included angle $\beta_1$ between the second conductive sheet 4012 and the first conductive sheet 4011 is equal to an included angle $\beta_2$ between the third conductive sheet 4013 and the first conductive sheet 4011. For example, each of the second conductive sheet 4012 and the third conductive sheet 4013 is substantially perpendicular to the first conductive sheet 4011. That is to say, the first conductive sheet 4011, the second conductive sheet 4012 and the third conductive sheet 4013 constitute a C-shaped conductive member, and the conductive fiber sheet 400 may be sleeved in the groove 203 of the shell 210 of the optical module 200 through an opening at a lower end.

Since the fourth side plate 3014 and the fifth side plate 3015 of the metal frame 301 are provided with an elastic fastener 3016, it is inconvenient to arrange conductive sheets among the bottom plate 2021 of the lower shell 202, the fourth side plate 3014 and the fifth side plate 3015. Therefore, the conductive fiber sheet 400 is composed of three conductive sheets, and an overall structure thereof is a C-shaped structure, so that the conductive fiber sheet 400 may be easily clamped into the groove 203 of the shell 210.

Figure 9:
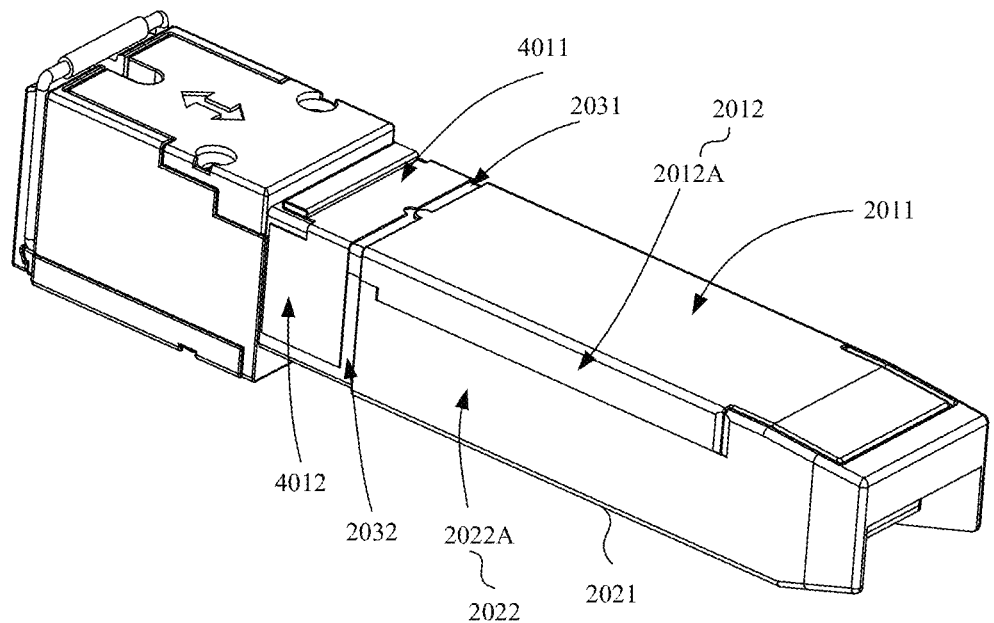
FIG. 9 is an assembly diagram of a conductive fiber sheet and a shell in an optical module, in accordance with some embodiments.
Figure 10:
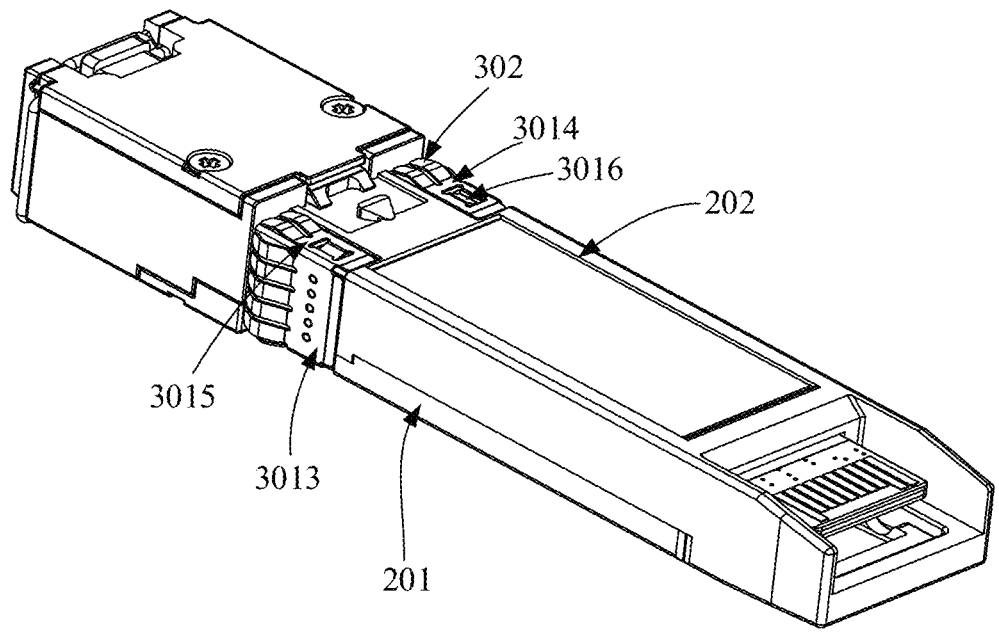
FIG. 10 is an assembly diagram of an elastic sleeve, a conductive fiber sheet and a shell in an optical module, in accordance with some embodiments.

FIG. 9 is an assembly diagram of a conductive fiber sheet in an optical module and a shell of the optical module according to some embodiments. FIG. 10 is an assembly diagram of an elastic sleeve, a conductive fiber sheet in an optical module and a shell of the optical module according to some embodiments. As shown in FIGS. 9 and 10, when the conductive fiber sheet 400 is clamped into the groove 203 of the shell 210 of the optical module 200, the first conductive sheet 4011 of the conductive fiber sheet 400 is clamped into the groove on the cover plate 2011 of the upper shell 201, the second conductive sheet 4012 is clamped into the grooves on the first upper side plate 2012A of the upper shell 201 and the first lower side plate 2022A of the lower shell 202, and the third conductive sheet 4013 is clamped into the grooves on the second upper side plate 2012B of the upper shell 201 and the second lower side plate 2022B of the lower shell 202.

When the conductive fiber sheet 400 is sleeved in the groove 203 of the shell 210 of the optical module 200, a thickness of the conductive fiber sheet 400 may be greater than a depth of the groove 203. That is, the conductive fiber sheet 400 protrudes from a surface of the shell 210 of the optical module 200. In this way, the conductive fiber sheet 400 can be compressed into the groove 203 by the elastic sleeve 300, so that a good electrical connection is formed between the elastic sleeve 300 and the shell 210 of the optical module 200. As a result, the conductive fiber sheet 400 is in sufficient contact with the shell 210 and the elastic sleeve 300, so as to ensure sufficient connection between the shell 210 of the optical module 200 and the elastic sleeve 300.

In some embodiments, a dimension of the first conductive sheet 4011 of the conductive fiber sheet 400 may be equal to or slightly less than a dimension of the first side plate 3011 of the metal frame 301, a dimension of the second conductive sheet 4012 may be equal to or slightly less than a dimension of the second side plate 3012, and a dimension of the third conductive sheet 4013 may be equal to or slightly less than a dimension of the third side plate 3013. In this way, a dimension of the conductive fiber sheet 400 is substantially equal to a dimension of the metal frame 301, so that the gap between the elastic sleeve 300 and the shell 210 of the optical module 200 may be effectively blocked.

Since contact between the metal frame 301 of the elastic sleeve 300 and the conductive fiber sheet 400 is also surface contact, there may still be a gap between the metal frame 301 and the conductive fiber sheet 400. Therefore, the metal frame 301 further includes a plurality of concave points 3017. The plurality of concave points 3017 are uniformly disposed on the first side plate 3011, the second side plate 3012 and the third side plate 3013, and the plurality of concave points 3017 are in contact with an outer surface of the conductive fiber sheet 400. The concave points 3017 may increase reliability of contact between the metal frame 301 and the conductive fiber sheet 400, and ensure sufficient contact between the metal frame 301 and the conductive fiber sheet 400.

In some embodiments, the concave points 3017 on the first side plate 3011, the second side plate 3012 and the third side plate 3013 may be made by stamping process, and the plurality of concave points 3017 are blind holes. As a result, the metal frame 301 and the conductive fiber sheet 400 are fully connected, which makes a resistance between the metal frame 301 and the conductive fiber sheet 400 low.

Figure 11:
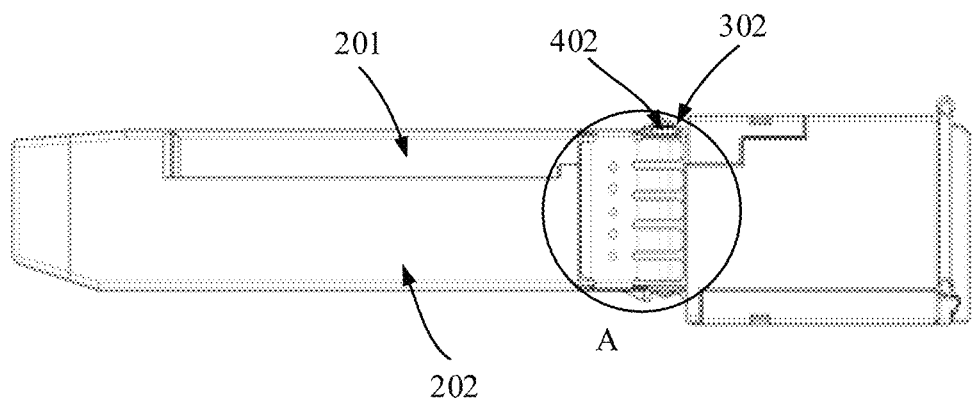
FIG. 11 is a side view of an assembly of an elastic sleeve, a conductive fiber sheet and a shell in an optical module, in accordance with some embodiments.
Figure 12:
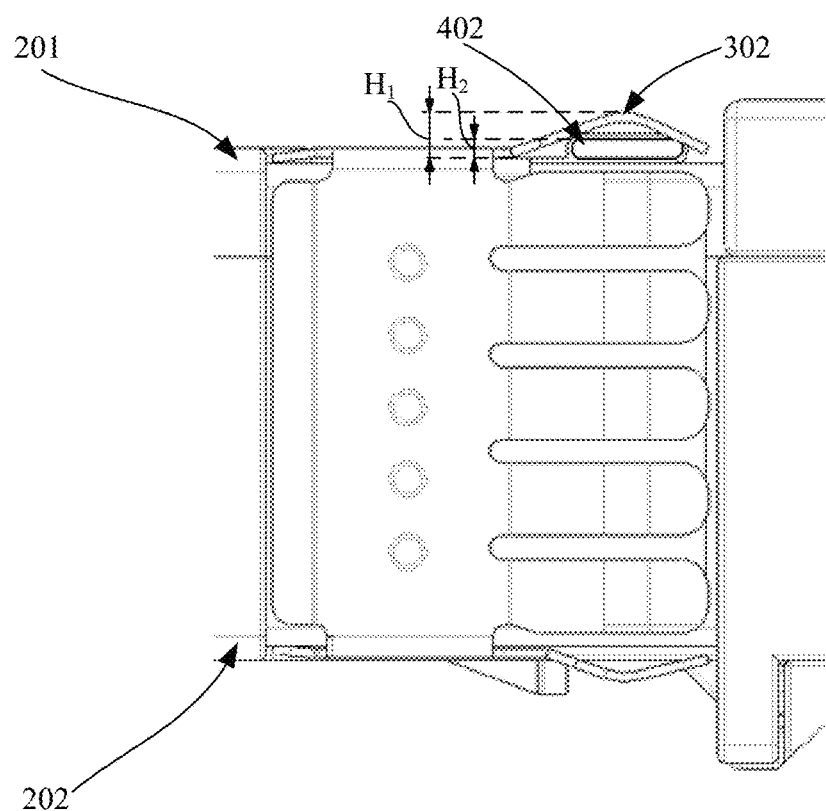
FIG. 12 is an enlarged view of a portion A in FIG. 11.

FIG. 11 is a side view of an assembly of an elastic sleeve, a conductive fiber sheet and a shell of the optical module according to some embodiments. FIG. 12 is an enlarged view of a portion A in FIG. 11. As shown in FIGS. 11 and 12, the conductive elastic member 402 is disposed on an end of the first conductive sheet 4011 of the conductive fiber sheet 400. The conductive elastic member 402 extends substantially in a length direction of the first conductive sheet 4011 (i.e., a direction substantially perpendicular to the second conductive sheet 4012 and the third conductive sheet 4013), and is located between the metal elastic pieces 302 of the elastic sleeve 300 and the first conductive sheet 4011. The conductive elastic member 402 and the first conductive sheet 4011 of the conductive frame 401 are arranged in a stepped shape, and the conductive elastic member 402 abuts against the metal elastic pieces 302 for withstanding the metal elastic pieces 302, so as to ensure that the metal elastic pieces 302 are in contact with the inner surface of the cage 106.

In some embodiments, the conductive elastic member 402 includes a top surface, a bottom surface, and two arc-shaped connecting surfaces connecting the top surface and the bottom surface. The top surface is in contact with the metal elastic pieces 302, and the bottom surface is fixed on the first conductive sheet 4011. In some other embodiments, an end of the first conductive sheet 401 is provided with a conductive boss, and the conductive boss extends in a length direction of the first conductive sheet 4011. The conductive boss has a through hole inside, an extension direction of the through hole is the same as that of the conductive boss, and the conductive elastic member 402 is inserted into the through hole for withstanding the metal elastic pieces 302.

In order to withstand the metal elastic pieces 302, a thickness of the conductive elastic member 402 is not less than a thickness $H_1$ of a metal elastic piece 302. That is, the thickness of the conductive elastic member 402 is greater than or equal to a distance $H_1$ from a highest point to a lowest point of the metal elastic piece 302, so as to withstand the metal elastic piece 302. When the optical module 200 is inserted into the cage 106, the inner surface of the cage 106 squeezes the metal elastic pieces 302. Since the conductive elastic member 402 has elasticity, the metal elastic pieces 302 squeeze the conductive elastic member 402, and the conductive elastic member 402 squeezes the conductive frame 401, and the conductive frame 401 squeezes the shell 210 of the optical module 200. Therefore, a gap between the elastic sleeve 300 and the cage 106, a gap between the elastic sleeve 300 and the conductive fiber sheet 400, and a gap between the conductive fiber sheet 400 and the shell 210 can be effectively blocked. As shown in FIG. 12, after the conductive elastic member 402 is squeezed by the metal elastic pieces 302, a thickness $H_2$ of the conductive elastic member 402 is less than or equal to a thickness $H_1$ of a metal elastic piece 302.

In some embodiments, the conductive elastic member 402 is a conductive foam. That is, a conductive cloth is wrapped around an outside of the conductive foam. The conductive foam has good elasticity. When the conductive fiber sheet 400 is clamped into the groove 203 of the shell 210, and then the elastic sleeve 300 is installed, a compression degree of the conductive foam is large, thereby avoiding inconvenience of installing the elastic sleeve 300.

An assembly process of the optical module provided by some embodiments of the present disclosure is as follows: first, photoelectric devices such as the circuit board 600, the light emitting device 700, and the light receiving device 800 of the optical module 200 are installed into the lower shell 202, and then the upper shell 201 covers the lower shell 202; then the conductive fiber sheet 400 is clamped into the first groove 2031 on the outer wall of the upper shell 201 and the second groove 2032 on the outer wall of the lower shell 202; then the elastic sleeve 300 is sleeved on an outside of the conductive fiber sheet 400, so that the conductive elastic member 402 of the conductive fiber sheet 400 is located between the first conductive sheet 4011 and the metal elastic pieces 302, and the elastic sleeve 300 is clamped into the clamping grooves 206 of the lower shell 202 through the elastic fasteners 3016 to fix the elastic sleeve 300.

After the optical module 200 is assembled, when the optical module 200 is inserted into the cage 106 of the optical network terminal 100, the inner surface of the cage 106 squeezes the metal elastic pieces 302 of the elastic sleeve 300, and the conductive elastic member 402 under the metal elastic pieces 302 withstands the metal elastic pieces 302, so that the metal elastic pieces 302 form a good electrical contact with the cage 106, and the gap between the elastic sleeve 300 and the cage 106 may be eliminated. In addition, the conductive fiber sheet 400 is located between the elastic sleeve 300 and the shell 210 of the optical module 200, so that the elastic sleeve 300 forms a good contact with the shell 210 of the optical module 200, and the gap between the elastic sleeve 300 and the shell 210 of the optical module 200 may be eliminated. In this way, a good contact is formed between the shell 210 of the optical module 200 and the cage 106, thereby forming a metal sealed cavity and achieving efficient shielding. As a result, electromagnetic waves between the shell 210 of the optical module 200 and the cage 106 are shielded, so that electromagnetic waves cannot radiate out of the cage 106 to affect other optoelectronic devices.

Figure 13:
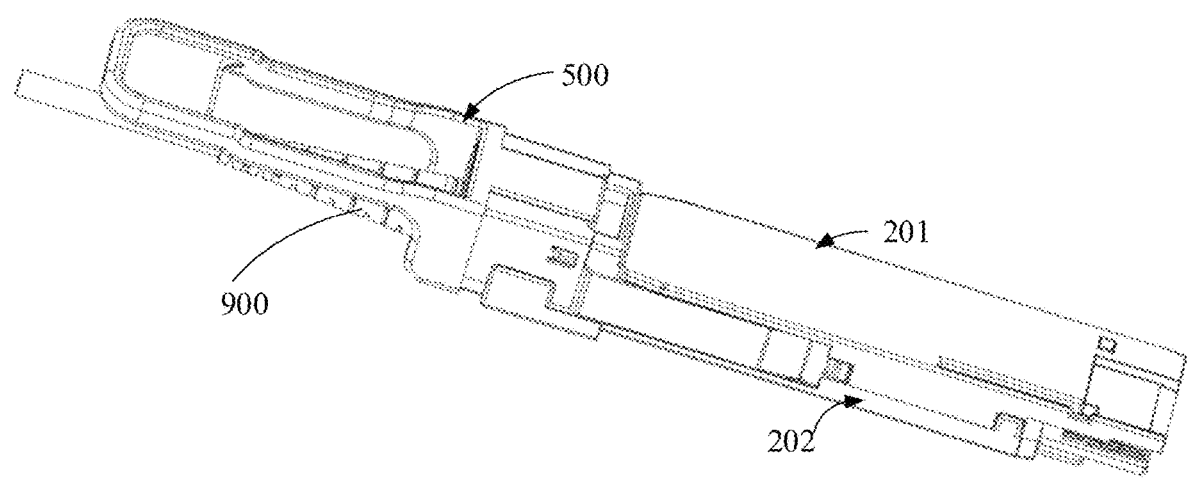
FIG. 13 is an assembly diagram of a shell and an unlocking component in an optical module, in accordance with some embodiments.
Figure 14:
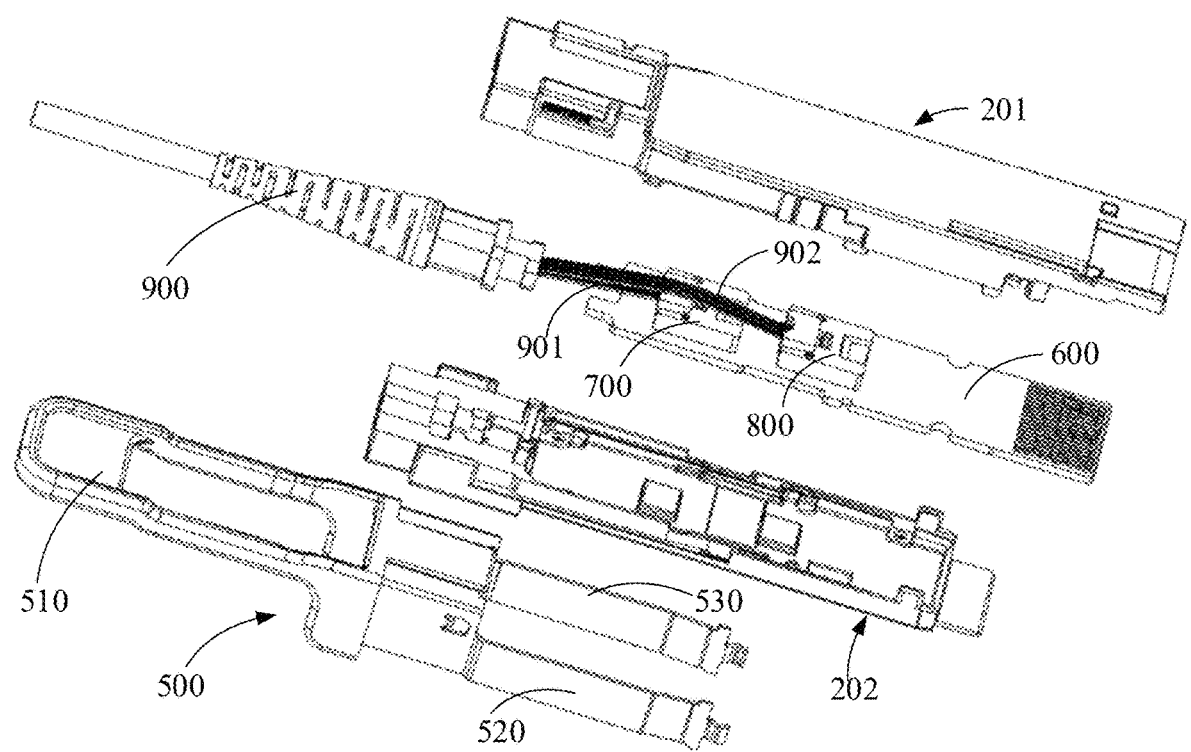
FIG. 14 is an exploded structural diagram of a shell and an unlocking component in an optical module, in accordance with some embodiments.

FIG. 13 is an assembly diagram of a shell and an unlocking component in an optical module according to some embodiments. FIG. 14 is an exploded structural diagram of a shell and an unlocking component in an optical module according to some embodiments. As shown in FIGS. 13 and 14, the optical module 200 further includes an unlocking component 500. The unlocking component 500 is located on an outer wall of the shell 210, and is configured to implement fixed connection between the optical module 200 and the master monitor, or to release the fixed connection between the optical module 200 and the master monitor.

An end of the unlocking component 500 may be matched and connected to an outer wall of an upper side plate 2012 of the upper shell 201, or may also be matched and connected to an outer wall of a lower side plate 2022 of the lower shell 202, or may also be matched and connected to outer walls of the upper side plate 2012 of the upper shell 201 and the lower side plate 2022 of the lower shell 202. FIG. 14 shows that an end of the unlocking component 500 is matched and connected to outer walls of the upper side plate 2012 of the upper shell 201 and the lower side plate 2022 of the lower shell 202.

As shown in FIG. 14, the unlocking component 500 includes a handle 510, a first unlocking cantilever 520 and a second unlocking cantilever 530. An end of the handle 510 is connected to one end of the first unlocking cantilever 520 and one end of the second unlocking cantilever 530, the other end of the first unlocking cantilever 520 is matched and connected to outer walls of the first upper side plate 2012A of the upper shell 201 and the first lower side plate 2022A of the lower shell 202, and the other end of the second unlocking cantilever 530 is matched and connected to outer walls of the second upper side plate 2012B of the upper shell 201 and the second lower side plate 2022B of the lower shell 202. The handle 510 is dragged, thereby driving the first unlocking cantilever 520 and the second unlocking cantilever 530 to move in an extension direction of the upper side plate 2012 of the upper shell 201 and the lower side plate 2022 of the lower shell 201. An arrangement of the handle 510 facilitates usage of the unlocking component 500. In some embodiments of the present disclosure, the first unlocking cantilever 520 and the second unlocking cantilever 530 are a metal member, such as a metal sheet component.

Figure 15:
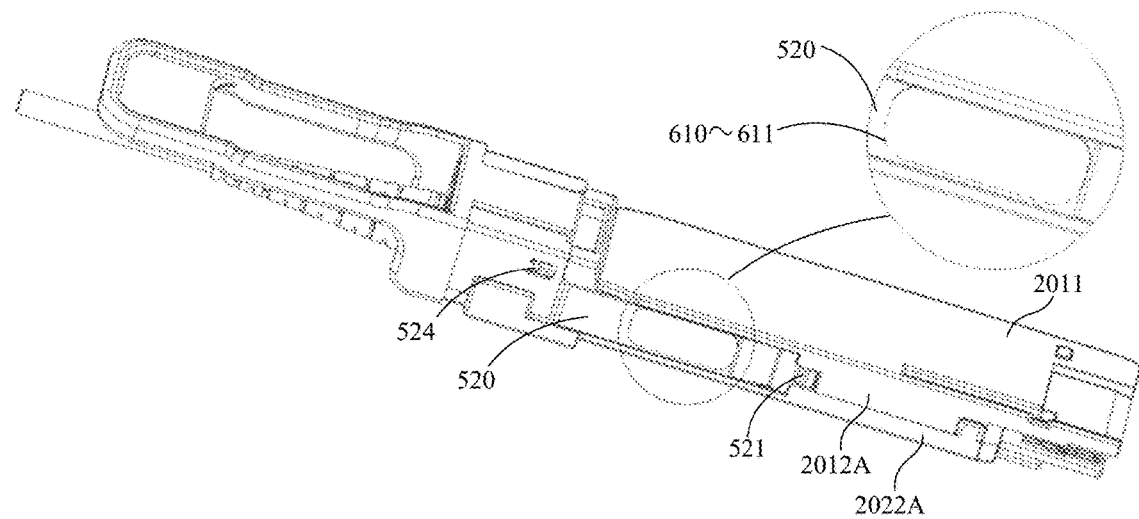
FIG. 15 is an assembly diagram of a shell and an unlocking component in an optical module, in accordance with some embodiments.
Figure 19:
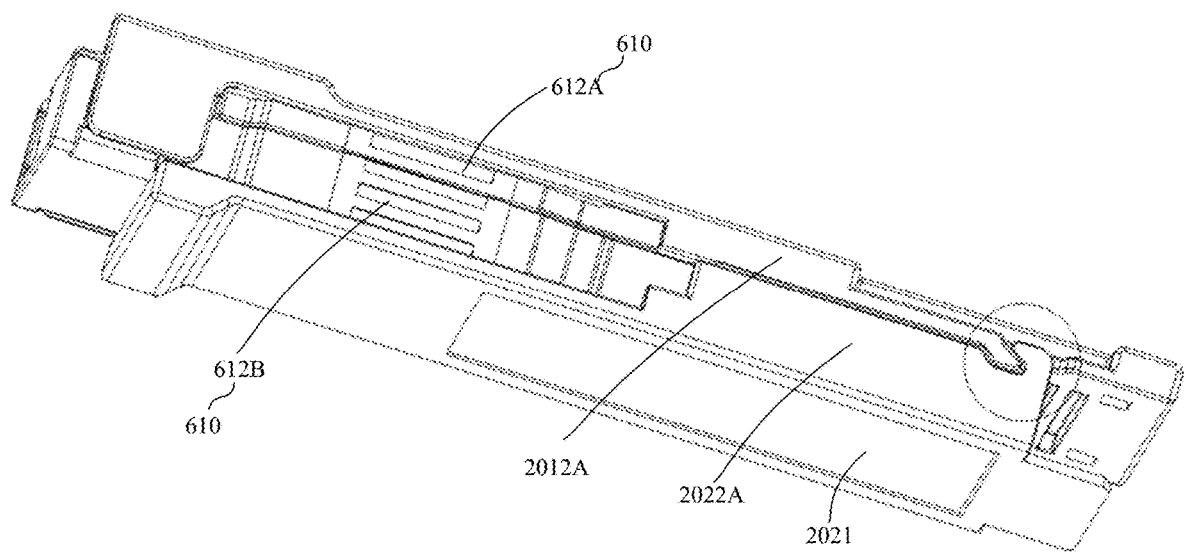
FIG. 19 is another structural diagram of a shell in an optical module, in accordance with some embodiments.

When materials of the outer wall of the shell 210 and the unlocking component 500 are relatively hard materials such as metal materials, and the hard materials are in direct contact with each other, and the contact is hard contact. When the outer wall of the shell 210 is in hard contact with the unlocking component 500, a gap will exist between the shell 210 and the unlocking component 500, so that electromagnetic waves radiated from the electrical port 204 of the optical module 200 may propagate along the gap. In order to prevent the electromagnetic waves from radiating and transmitting along the gap between the outer wall of the shell 210 and the unlocking component 500, as shown in FIGS. 15 and 19, the optical module 200 further includes at least one conductive fiber sheet 610. The at least one conductive fiber sheet 610 is disposed on the outer wall of the shell 210, the unlocking component 500 covers the at least one conductive fiber sheet 610, the shell 210 and the unlocking component 500 are connected by the at least one conductive fiber sheet 610, and the at least one conductive fiber sheet 610 is configured to seal the gap between the shell 210 and the unlocking component 500. Some embodiments of the present disclosure do not limit the number of the at least one conductive fiber sheet 610, which may be one, two or more.

In some embodiments of the present disclosure, as shown in FIGS. 15 and 19, the conductive fiber sheet 610 is a conductive pad 611 disposed on the outer wall of the shell 210, or is a convex rib 612 formed on the outer wall of the shell 210.

The conductive fiber sheet 610 may be disposed on the outer wall of the upper side plate 2012 of the upper shell 201, or may be disposed on the outer wall of the lower side plate 2022 of the lower shell 202, or may further be disposed on the outer walls of the upper side plate 2012 of the upper shell 201 and the lower side plate 2022 of the lower shell 202. FIGS. 15 and 19 show that the conductive fiber sheet 610 is disposed on outer walls of the upper side plate 2012 of the upper shell 201 and the lower side plate 2022 of the lower shell 202.

In the optical module provided by some embodiments of the present disclosure, the outer wall of the shell 210 is provided with the conductive fiber sheet 610. On the one hand, the shell 210 and the unlocking component 500 are connected by the conductive fiber sheet 610. On the other hand, formation of a gap between the shell 210 and the unlocking component 500 is avoided, thereby preventing the electromagnetic waves from radiating and propagating from the gap between the shell 210 and the unlocking component 500. Thus, electromagnetic shielding effect of the optical module 200 is improved.

Figure 16:
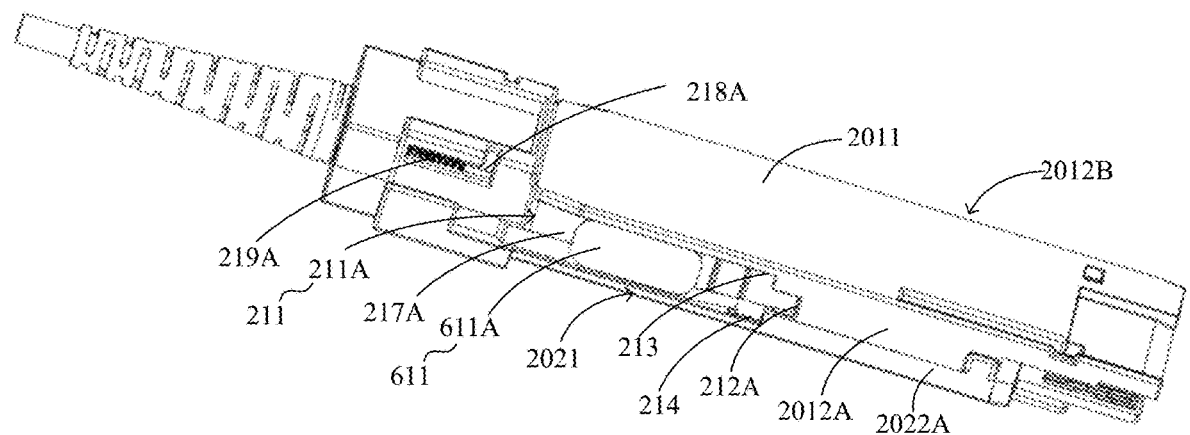
FIG. 16 is an assembly diagram of a conductive pad and a shell in an optical module, in accordance with some embodiments.

As shown in FIG. 16, in order to facilitate installation of the unlocking component 500 and ensure flatness of an outer contour of the optical module 200, the shell 210 has at least one recessed area 211. The at least one recessed area 211 is disposed on outer walls of the upper side plate 2012 and the lower side plate 2022, and the recessed area 211 is configured to be matched and connected to an end of the unlocking component 500. For example, the recessed area 211 is matched and connected to an end of the first unlocking cantilever 520 away from the handle 510 or an end of the second unlocking cantilever 530 away from the handle 510. At least one conductive fiber sheet 610 is disposed in a corresponding recessed area 211. Some embodiments of the present disclosure do not limit the number of the at least one recessed area 211, which may be one, two or more.

FIG. 15 is an assembly diagram of a shell and an unlocking component in an optical module according to some embodiments. FIG. 16 is an assembly diagram of a conductive pad and a shell in an optical module according to some embodiments. As shown in FIGS. 15 and 16, the conductive fiber sheet 610 is a conductive pad 611, and at least one conductive pad 611 is disposed on outer walls of the upper side plate 2012 of the upper shell 201 and the lower side plate 2022 of the lower shell 202. The unlocking component 500 covers the at least one conductive pad 611. For example, the first unlocking cantilever 520 or the second unlocking cantilever 530 covers the at least one conductive pad 611, and the at least one conductive pad 611 is configured to connect the first unlocking cantilever 520, the upper side plate 2012 of the upper shell 201 and the lower side plate 2022 of the lower shell 202, or to connect the second unlocking cantilever 530, the upper side plate 2012 of the upper shell 201 and the lower side plate 2022 of the lower shell 202.

In some embodiments of the present disclosure, a thickness of the conductive pad 611 is in a range of 0.1 mm to 0.3 mm, for example, 0.1 mm, 0.15 mm, 0.2 mm, 0.25 mm, or 0.3 mm. The conductive pad 611 may be a flexible conductive cloth, a flexible wave-absorbing material pad, or the like, and the conductive pad 611 may be attached to the outer wall of the shell 210.

As mentioned above, if the outer wall of the shell 210 made of metal materials is in direct contact with the unlocking component 500 made of metal materials, contact between the outer wall of the shell 210 and the unlocking component 500 is hard contact, and a gap usually exists between objects with hard contact. When the optical module 200 is inserted into the cage of the master monitor, electromagnetic waves radiated from the electrical port 204 of the optical module 200 may radiate and propagate along the gap between the outer wall of the shell 210 and the unlocking component 500. In the optical module provided by some embodiments of the present disclosure, the conductive pad 611 is disposed between the shell 210 and the unlocking component 500, and the shell 210 and the unlocking component 500 are connected by the conductive pad 611, so as to avoid forming a gap between the shell 210 and the unlocking component 500. Thus, electromagnetic waves are prevented from radiating and propagating from the gap between the shell 210 and the unlocking component 500, and the electromagnetic shielding effect of the optical module 200 is improved.

Figure 17:
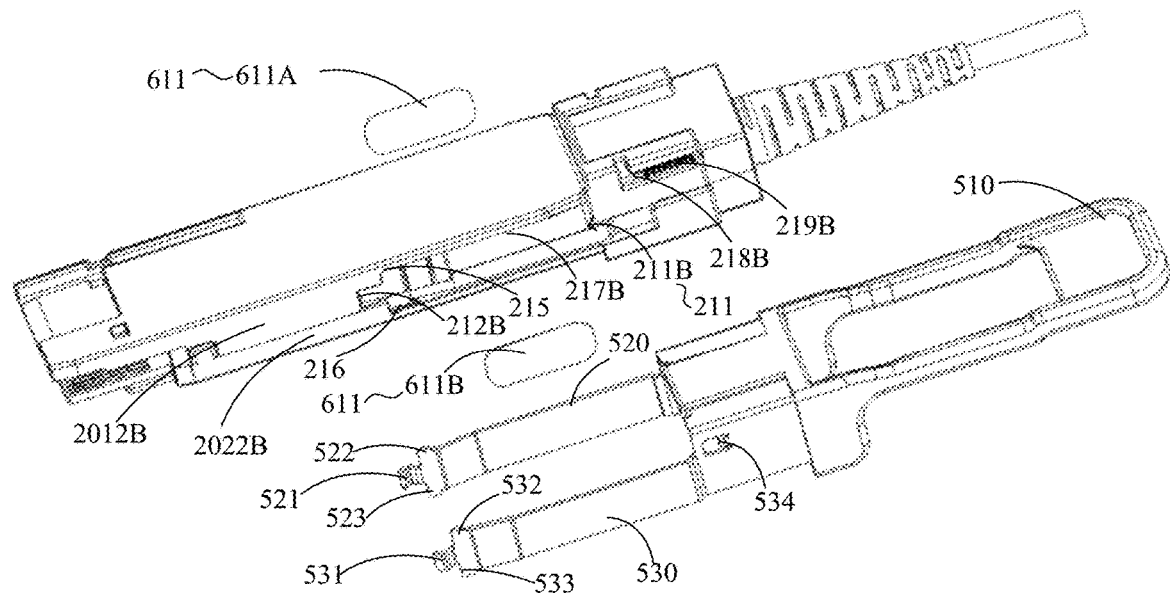
FIG. 17 is an exploded diagram of a shell, a conductive pad, and an unlocking component in an optical module, in accordance with some embodiments.
Figure 18:
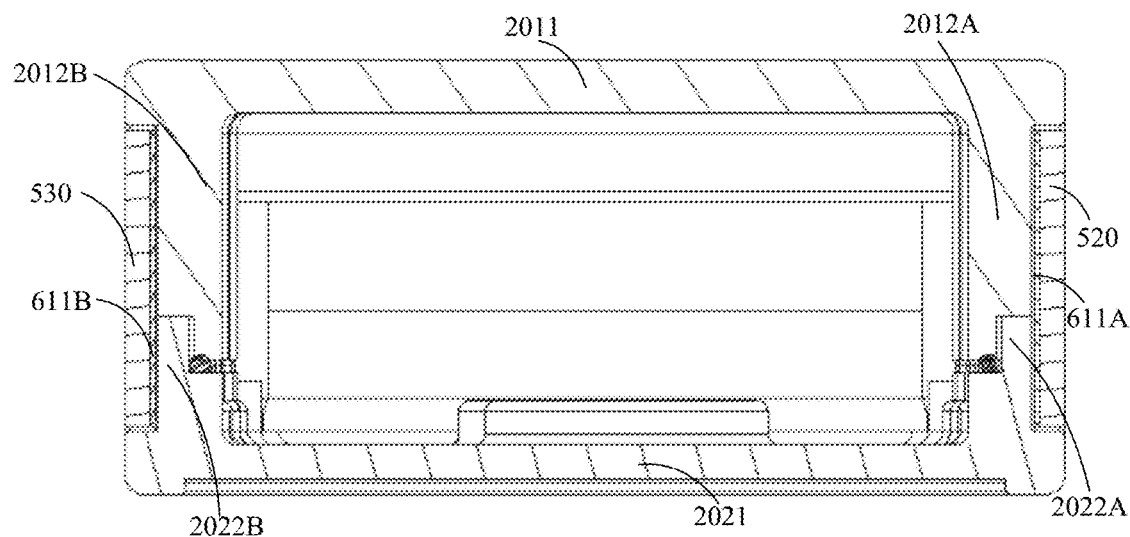
FIG. 18 is a sectional view of a conductive pad, an unlocking component, and a shell in an optical module, in accordance with some embodiments.

In some embodiments of the present disclosure, the at least one conductive pad 611 includes two conductive pads 611, which are a first conductive pad 611A and a second conductive pad 611B. As shown in FIGS. 16 to 18, the first conductive pad 611A is disposed on the outer walls of the first upper side plate 2012A and the first lower side plate 2022A. The first unlocking cantilever 520 covers the first conductive pad 611A, and the first conductive pad 611A is fixed between the first unlocking cantilever 520 and the outer walls of the first upper side plate 2012A and the first lower side plate 2022A. The first conductive pad 611A connects the first unlocking cantilever 520 and the outer walls of the first upper side plate 2012A and the first lower side plate 2022A, so that the first conductive pad 611A seals the gap between the first unlocking cantilever 520 and the outer walls of the first upper side plate 2012A and the first lower side plate 2022A, thereby preventing electromagnetic waves from radiating out from the gap between the first unlocking cantilever 520 and the outer walls of the first upper side plate 2012A and the first lower side plate 2022A.

FIG. 17 is an exploded diagram of a shell, a conductive pad, and an unlocking component in an optical module according to some embodiments. As shown in FIG. 17, the second conductive pad 611B is disposed on the outer walls of the second upper side plate 2012B and the second lower side plate 2022B. The second unlocking cantilever 530 covers the second conductive pad 611B, and the second conductive pad 611B is fixed between the second unlocking cantilever 530 and the outer walls of the second upper side plate 2012B and the second lower side plate 2022B. The second conductive pad 611B connects the second unlocking cantilever 530 and the outer walls of the second upper side plate 2012B and the second lower side plate 2022B, so that the second conductive pad 611B seals the gap between the second unlocking cantilever 530 and the outer walls of the second upper side plate 2012B and the second lower side plate 2022B, thereby preventing electromagnetic waves from radiating out from the gap between the second unlocking cantilever 530 and the outer walls of the second upper side plate 2012B and the second lower side plate 2022B.

For example, as shown in FIGS. 16 and 17, the shell 210 has two recessed areas 211, which are a first recessed area 211A and a second recessed area 211B. The first recessed area 211A is disposed on the first upper side plate 2012A and the first lower side plate 2022A, the first recessed area 211A is configured to be matched and connected to the first unlocking cantilever 520, and the first conductive pad 611A is disposed in the first recessed area 211A. The second recessed area 211B is disposed on the second upper side plate 2012B and the second lower side plate 2022B, the second recessed area 211B is configured to be matched and connected to the second unlocking cantilever 530, and the second conductive pad 611B is disposed in the second recessed area 211B.

The first conductive pad 611A seals the gap among the first unlocking cantilever 520, the first upper side plate 2012A and the first lower side plate 2022A, and then the first conductive pad 611A is connected to the first upper side plate 2012A, the first lower side plate 2022A and the first unlocking cantilever 520. The second conductive pad 611B seals the gap among the second unlocking cantilever 530, the second upper side plate 2012B and the second lower side plate 2022B, and the second conductive pad 611B is connected to the second upper side plate 2012B, the second lower side plate 2022B and the second unlocking cantilever 530. In this way, by arranging the first conductive pad 611A among the first upper side plate 2012A, the first lower side plate 2022A and the first unlocking cantilever 520, and arranging the second conductive pad 611B among the second upper side plate 2012B, the second lower side plate 2022B and the second unlocking cantilever 530, it is possible to ensure that the first unlocking cantilever 520 is in sufficient contact with the outer walls of the first upper side plate 2012A and the first lower side plate 2022A, and the second unlocking cantilever 530 is in sufficient contact with the outer walls of the second upper side plate 2012B and the second lower side plate 2022B, to prevent electromagnetic waves from radiating and transmitting from the gap among the first upper side plate 2012A, the first lower side plate 2022A and the first unlocking cantilever 520 and the gap among the second upper side plate 2012B, the second lower side plate 2022B and the second unlocking cantilever 530, and to fully improve the electromagnetic shielding effect of the optical module 200.

In some embodiments of the present disclosure, a middle portion of the first unlocking cantilever 520 covers the first conductive pad 611A, and a middle portion of the second unlocking cantilever 530 covers the second conductive pad 611B. In some embodiments of the present disclosure, the middle portion of the first unlocking cantilever 520 squeezes and is in contact with the first conductive pad 611A, and the middle portion of the second unlocking cantilever 530 squeezes and is in contact with the second conductive pad 611B.

In some embodiments of the present disclosure, a width of the first conductive pad 611A is greater than or equal to a width of the middle portion of the first unlocking cantilever 520, and a width of the second conductive pad 611B is greater than or equal to a width of the middle portion of the second unlocking cantilever 530. In some embodiments of the present disclosure, the width of the first conductive pad 611A is equal to the width of the middle portion of the first unlocking cantilever 520, and the width of the second conductive pad 611B is equal to the width of the middle portion of the second unlocking cantilever 530.

In order to facilitate connection between the first unlocking cantilever 520 and the first upper side plate 2012A and unlocking of the optical module 200 and the cage 106, the unlocking component 500 further includes a first locking hook 521 disposed on an end of the first unlocking cantilever 520 away from the handle 510, and the shell 210 further has a first locking slot 212A disposed on the outer wall of the first upper side plate 2012A. When the unlocking component 500 is not dragged, the first locking hook 521 is embedded in the first locking slot 212A. When the unlocking component 500 is dragged, the first locking hook 521 moves in the first locking slot 212A along a dragging direction. When the unlocking component 500 is released after being dragged, the first locking hook 521 returns to an initial position in the first locking slot 212A. Therefore, the first locking slot 212A may be used to accommodate the first locking hook 521 and limit movement of the first locking hook 521.

In some embodiments of the present disclosure, the unlocking component 500 further includes a first protrusion 522 and a third protrusion 523 disposed on an end of the first unlocking cantilever 520 away from the handle 510. The first protrusion 522 is located on one side of the first unlocking cantilever 520, and the third protrusion 523 is located on the other side of the first unlocking cantilever 520. In some embodiments of the present disclosure, the shell 210 further has a first position-limiting groove 213 disposed on the first upper side plate 2012A and a third position-limiting groove 214 disposed on the first lower side plate 2022A. The first protrusion 522 is embedded in the first position-limiting groove 213, and the third protrusion 523 is embedded in the third position-limiting groove 214. When the unlocking component 500 is dragged or the unlocking component 500 is released after being dragged, the first protrusion 522 moves in the first position-limiting groove 213, and the third protrusion 523 moves in the third position-limiting groove 214. Cooperation of the first protrusion 522 with the first position-limiting groove 213 and cooperation of the third protrusion 523 with the third position-limiting groove 214 make it more convenient to achieve a positional limit on unlocking movement of the first unlocking cantilever 520 and ensure stability of usage of the unlocking component 500.

In some embodiments of the present disclosure, in order to facilitate connection between the second unlocking cantilever 530 and the second upper side plate 2012B and unlocking of the optical module 200 and the cage 106, the unlocking component 500 further includes a second locking hook 531 disposed on an end of the second unlocking cantilever 530 away from the handle 510, and the shell 210 further has a second locking slot 212B disposed on the outer wall of the second upper side plate 2012B. When the unlocking component 500 is not dragged, the second locking hook 531 is embedded in the second locking slot 212B. When the unlocking component 500 is dragged, the second locking hook 531 moves in the second locking slot 212B along a dragging direction. When the unlocking component 500 is released after being dragged, the second locking hook 531 returns to an initial position in the second locking slot 212B. Therefore, the second locking slot 212B may be used to accommodate the second locking hook 531 and limit movement of the second locking hook 531.

In some embodiments of the present disclosure, during unlocking of the optical module 200, the handle 510 is dragged, and the first locking hook 521 and the second locking hook 531 are used to lift up a locking member on the cage of the master monitor, so that the optical module 200 may be unlocked and detached from the cage of the master monitor.

In some embodiments of the present disclosure, the unlocking component 500 further includes a second protrusion 532 and a fourth protrusion 533 disposed on an end of the second unlocking cantilever 530 away from the handle 510, the second protrusion 532 is located on one side of the second unlocking cantilever 530, and the fourth protrusion 533 is located on the other side of the second unlocking cantilever 530. In some embodiments of the present disclosure, the shell 210 further has a second position-limiting groove 215 disposed on the second upper side plate 2012B and a fourth position-limiting groove 216 disposed on the second lower side plate 2022B. The second protrusion 532 is embedded in the second position-limiting groove 215, and the fourth protrusion 533 is embedded in the fourth position-limiting groove 216. When the unlocking component 500 is dragged or the unlocking component 500 is released after being dragged, the second protrusion 532 moves in the second position-limiting groove 215, and the fourth protrusion 533 moves in the fourth position-limiting groove 216. Cooperation of the second protrusion 532 with the second position-limiting groove 215 and cooperation of the fourth protrusion 533 with the fourth position-limiting groove 216 make it more convenient to achieve a positional limit on unlocking movement of the second unlocking cantilever 530 and ensure the stability of usage of the unlocking component 500.

In some embodiments of the present disclosure, the outer walls of the first upper side plate 2012A and the first lower side plate 2022A have a first mounting surface 217A, the first mounting surface 217A is a bottom surface of the first recessed area 211A, and the first conductive pad 611A is attached to the first mounting surface 217A. An arrangement position of the first mounting surface 217A should avoid interfering with the unlocking component 500. An arrangement of the first mounting surface 217A facilitates installation and arrangement of the first conductive pad 611A, ensures installation accuracy of the first conductive pad 611A, and avoids improper installation of the first conductive pad 611A, which affects usage of the unlocking component 500. For example, in order to prevent improper installation of the first conductive pad 611A from affecting movement of the first unlocking cantilever 520 relative to the shell 210, the first mounting surface 217A is away from the first locking slot 212A. In some embodiments of the present disclosure, a position of the first mounting surface 217A may correspond to that of a clamping member of the cage of the master monitor clamping the optical module, and the clamping member of the cage of the master monitor clamping the optical module may squeeze the first unlocking cantilever 520 when clamping the optical module, so that the first unlocking cantilever 520 is in sufficient contact with the first conductive pad 611A.

In some embodiments of the present disclosure, the outer walls of the second upper side plate 2012B and the second lower side plate 2022B have a second mounting surface 217B, the second mounting surface 217B is a bottom surface of the second recessed area 211B, and the second conductive pad 611B is attached to the second mounting surface 217B. An arrangement position of the second mounting surface 217B should avoid interfering with the unlocking component 500. An arrangement of the second mounting surface 217B facilitates installation and arrangement of the second conductive pad 611B, ensures installation accuracy of the second conductive pad 611B, and avoids improper installation of the second conductive pad 611B, which affects usage of the unlocking component 500. For example, in order to prevent improper installation of the second conductive pad 611B from affecting movement of the second unlocking cantilever 530 relative to the shell 210, the second mounting surface 217B is away from the second locking slot 212B. In some embodiments of the present disclosure, a position of the second mounting surface 217B may correspond to that of a clamping member of the cage of the master monitor clamping the optical module, and then the clamping member of the cage of the master monitor clamping the optical module may squeeze the second unlocking cantilever 530 when clamping the optical module 200, so that the second unlocking cantilever 530 is in sufficient contact with the second conductive pad 611B.

In some embodiments of the present disclosure, the first mounting surface 217A is disposed on the first lower side plate 2022A, and the second mounting surface 217B is disposed on the second lower side plate 2022B; in some other embodiments of the present disclosure, the first mounting surface 217A is disposed on the first upper side plate 2012A, and the second mounting surface 217B is disposed on the second upper side plate 2012B.

In some embodiments of the present disclosure, as shown in FIGS. 16 and 17, the shell 210 has a first spring groove 218A and a second spring groove 218B, and the first spring groove 218A is disposed on an end of the first upper side plate 2012A of the upper shell 201 close to the optical port 205, and the second spring groove 218B is disposed on an end of the second upper side plate 2012B of the upper shell 201 close to the optical port 205. The optical module 200 further includes a first spring 219A and a second spring 219B, the first spring 219A is disposed in the first spring groove 218A, and the second spring 219B is disposed in the second spring groove 218B. The unlocking component 500 further includes a first spring hook 524 and a second spring hook 534, the first spring hook 524 is disposed on an end of the first unlocking cantilever 520 connected to the handle 510, and the second spring hook 534 is disposed on an end of the second unlocking cantilever 530 connected to the handle 510.

The first spring hook 524 is matched and connected to the first spring 219A, and the second spring hook 534 is matched and connected to the second spring 219B. Cooperation between the first spring hook 524 and the first spring 219A and cooperation between the second spring hook 534 and the second spring 219B may achieve automatic recovery after the unlocking component 500 unlocks the optical module 200.

FIG. 19 is another structural diagram of a shell in an optical module, in accordance with some embodiments. As shown in FIG. 19, the conductive fiber sheet 610 is a convex rib 612. At least one conductive fiber sheet 610 includes a plurality of convex ribs 612, and the plurality of convex ribs 612 are disposed on the outer wall of the shell 210.

In some embodiments of the present disclosure, a plurality of first convex ribs 612A are disposed on the outer wall of the first upper side plate 2012A. The plurality of first convex ribs 612A are connected to the first unlocking cantilever 520 and the first upper side plate 2012A, and are configured to seal the gap between the first unlocking cantilever 520 and the first upper side plate 2012A. A plurality of second convex ribs 612B are disposed on the first lower side plate 2022A. The plurality of second convex ribs 612B are connected to the first unlocking cantilever 520 and the first lower side plate 2022A, and are configured to seal the gap between the first unlocking cantilever 520 and the first lower side plate 2022A.

When the optical module 200 is inserted into the master monitor for use, electromagnetic radiation in the master monitor is transmitted to the plurality of first convex ribs 612A and the plurality of second convex ribs 612B, and the plurality of first convex ribs 612A and the plurality of second convex ribs 612B seal the gap between the first unlocking cantilever 520 and the shell 210. Thus, electromagnetic waves are prevented from radiating out from the gap between the first unlocking cantilever 520 and the shell 210. In addition, grooves formed between adjacent convex ribs may reflect and absorb the electromagnetic radiation for multiple times to further improve the electromagnetic shielding effect. Therefore, effect of improving electromagnetic shielding of the master monitor may be achieved through the plurality of first convex ribs 612A and the plurality of second convex ribs 612B.

In some embodiments of the present disclosure, a plurality of third convex ribs may be disposed on the second upper side plate 2012B, and a plurality of fourth convex ribs may be disposed on the second lower side plate 2022B. For structures and functions of the plurality of third convex ribs and the plurality of fourth convex ribs, reference may be made to those of the plurality of first convex ribs 612A and the plurality of second convex ribs 612B.

In some embodiments of the present disclosure, a height of each rib on the outer walls of the first upper side plate 2012A, the first lower side plate 2012B, the second upper side plate 2022A and the second lower side plate 2022B is in a range of 0.05 to 0.15 mm, a width thereof is in a range of 0.5 to 1.5 mm, and spacing between adjacent convex ribs is in a range of 0.5 to 1.5 mm. In this way, it is convenient to further ensure the electromagnetic shielding effect.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical module, comprising:
    a shell having a groove disposed on an outer wall thereof;
    an elastic sleeve including a metal frame and a plurality of metal elastic pieces, the metal frame being sleeved in the groove and fixedly connected to the shell; the plurality of metal elastic pieces being disposed on an edge of the metal frame and extending to an outside of the metal frame; and
    a conductive fiber sheet disposed between the shell and the elastic sleeve to connect the shell and the elastic sleeve, wherein
    the conductive fiber sheet includes:
        a conductive frame located between the shell and the metal frame; and
        a conductive elastic member disposed on an edge of the conductive frame and arranged in a stepped shape with the conductive frame, and the conductive elastic member abutting against the plurality of metal elastic pieces.

2. The optical module according to claim 1, wherein a thickness of the conductive frame is greater than a depth of the groove.

3. The optical module according to claim 1, wherein a thickness of the conductive elastic member is greater than or equal to a thickness of a metal elastic piece.

4. The optical module according to claim 1, wherein the metal frame includes a first side plate, a second side plate, a third side plate, a fourth side plate and a fifth side plate;
    an end of the first side plate is connected to the second side plate, and another end of the first side plate is connected to the third side plate; an end of the second side plate away from the first side plate is connected to the fourth side plate, and an end of the third side plate away from the first side plate is connected to the fifth side plate; and
    a gap exists between the fourth side plate and the fifth side plate, and the metal frame is sleeved on an outside of the conductive frame through the gap.

5. The optical module according to claim 4, wherein the plurality of metal elastic pieces are disposed on edges of the first side plate, the second side plate, the third side plate, the fourth side plate and the fifth side plate.

6. The optical module according to claim 5, wherein the plurality of metal elastic pieces extend to an outside of the elastic sleeve along the edges of the first side plate, the second side plate, the third side plate, the fourth side plate and the fifth side plate, and are arranged in an umbrella shape.

7. The optical module according to claim 4, wherein the metal frame includes a first elastic fastener and a second elastic fastener, the first elastic fastener is disposed on the fourth side plate, and the second elastic fastener is disposed on the fifth side plate; and
    the shell has a first clamping groove and a second clamping groove, and the first elastic fastener and the second elastic fastener are fixedly connected to the first clamping groove and the second clamping groove respectively.

8. The optical module according to claim 4, wherein the metal frame further includes a plurality of concave points; and
    the plurality of concave points are disposed on the first side plate, the second side plate and the third side plate, and are in contact with an outer surface of the conductive fiber sheet.

9. The optical module according to claim 8, wherein the plurality of concave points are blind holes.

10. The optical module according to claim 4, wherein the conductive frame includes a first conductive sheet, a second conductive sheet and a third conductive sheet, an end of the first conductive sheet is connected to the second conductive sheet, and another end of the first conductive sheet is connected to the third conductive sheet; and
    the first conductive sheet is located between the shell and the first side plate, the second conductive sheet is located between the shell and the second side plate, and the third conductive sheet is located between the shell and the third side plate.

11. The optical module according to claim 10, wherein the conductive elastic member is disposed on the first conductive sheet and extends in a length direction of the first conductive sheet.

12. The optical module according to claim 10, wherein the second conductive sheet and the third conductive sheet are arranged on a same side of the first conductive sheet, and an included angle between the second conductive sheet and the first conductive sheet is equal to an included angle between the third conductive sheet and the first conductive sheet.

13. The optical module according to claim 10, wherein a dimension of the first conductive sheet is equal to or slightly less than a dimension of the first side plate, a dimension of the second conductive sheet is equal to or slightly less than a dimension of the second side plate, and a dimension of the third conductive sheet is equal to or slightly less than a dimension of the third side plate.

14. The optical module according to claim 4, wherein the second side plate and the third side plate are disposed on a same side of the first side plate, and an included angle between the second side plate and the first side plate is equal to an included angle between the third side plate and the first side plate; and
    the fourth side plate and the fifth side plate are located in a same plane, the fourth side plate and the fifth side plate both extend toward an inside of the elastic sleeve, and an included angle between the fourth side plate and the second side plate is equal to an included angle between the fifth side plate and the third side plate.

15. The optical module according to claim 1, wherein the groove is configured to surrounds the outer wall of the shell;
    the shell includes a lower shell and an upper shell covering the lower shell; the lower shell includes a bottom plate, and two lower side plates located on two sides of the bottom plate and disposed perpendicular to the bottom plate; and the upper shell includes a cover plate, and two upper side plates located on two sides of the cover plate and disposed perpendicular to the cover plate; and
    the metal frame is fixedly connected to the bottom plate of the lower shell.

16. The optical module according to claim 15, wherein the groove includes a first groove and a second groove;
    the first groove is disposed on outer walls of the cover plate and the two upper side plates; and
    the second groove is disposed on outer walls of the bottom plate and the two lower side plates.

\* \* \* \* \*